US010600005B2

United States Patent
Gunes et al.

(10) Patent No.: US 10,600,005 B2
(45) Date of Patent: Mar. 24, 2020

(54) SYSTEM FOR AUTOMATIC, SIMULTANEOUS FEATURE SELECTION AND HYPERPARAMETER TUNING FOR A MACHINE LEARNING MODEL

(71) Applicant: SAS Institute Inc., Cary, NC (US)

(72) Inventors: Funda Gunes, Morrisville, NC (US); Wendy Ann Czika, Cary, NC (US); Susan Edwards Haller, Raleigh, NC (US); Udo Sglavo, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/411,590

(22) Filed: May 14, 2019

(65) Prior Publication Data

US 2019/0370684 A1    Dec. 5, 2019

Related U.S. Application Data

(60) Provisional application No. 62/679,581, filed on Jun. 1, 2018, provisional application No. 62/712,756, filed on Jul. 31, 2018.

(51) Int. Cl.
*G06N 20/00* (2019.01)
*G06N 3/08* (2006.01)

(52) U.S. Cl.
CPC ............ *G06N 20/00* (2019.01); *G06N 3/08* (2013.01)

(58) Field of Classification Search
CPC .................................................... G06N 20/00
(Continued)

(56) References Cited

U.S. PATENT DOCUMENTS 8,438,122 B1 *  5/2013  Mann .................... G06N 20/00
                                                       706/12
9,390,370 B2    7/2016  Kingsbury
(Continued)

FOREIGN PATENT DOCUMENTS

WO    WO 2015/184729    12/2015

OTHER PUBLICATIONS

Prashant Singh and Andreas Hellander. 2018. Hyperparameter optimization for approximate bayesian computation. In Proceedings of the 2018 Winter Simulation Conference (WSC '18). IEEE Press, 1718-1729 (Year: 2018).*

(Continued)

*Primary Examiner* — James D. Rutten
(74) *Attorney, Agent, or Firm* — Bell & Manning, LLC

(57) ABSTRACT

A computing device selects a feature set and hyperparameters for a machine learning model to predict a value for a characteristic in a scoring dataset. A number of training model iterations is determined. A unique evaluation pair is selected for each iteration that indicates a feature set selected from feature sets and a hyperparameter configuration selected from hyperparameter configurations. A machine learning model is trained using each unique evaluation pair. Each trained machine learning model is validated to compute a performance measure value. An estimation model is trained with the feature set, the hyperparameter configuration, and the performance measure value computed for unique evaluation pair. The trained estimation model is executed to compute the performance measure value for each unique evaluation pair. A final feature set and a final hyperparameter configuration are selected based on the computed performance measure value.

30 Claims, 5 Drawing Sheets

(58) Field of Classification Search
USPC .......................................................... 706/11
See application file for complete search history.

(56) References Cited

U.S. PATENT DOCUMENTS

| | | | | |
|---|---|---|---|---|
| 2007/0260563 | A1* | 11/2007 | Fan | G06N 20/00 706/12 |
| 2007/0271075 | A1* | 11/2007 | Chen | G06K 9/6228 703/2 |
| 2013/0097103 | A1* | 4/2013 | Chari | G06N 20/00 706/12 |
| 2014/0122387 | A1* | 5/2014 | Chi | G06N 20/00 706/12 |
| 2014/0172754 | A1* | 6/2014 | He | G06N 20/00 706/12 |
| 2014/0344193 | A1* | 11/2014 | Bilenko | G06N 20/00 706/12 |
| 2016/0110657 | A1* | 4/2016 | Gibiansky | G06N 20/00 706/12 |
| 2016/0188207 | A1* | 6/2016 | Choi | G06N 3/063 711/153 |
| 2016/0307098 | A1* | 10/2016 | Goel | G06N 3/082 |
| 2017/0132528 | A1 | 5/2017 | Asian | |
| 2018/0240041 | A1* | 8/2018 | Koch | G06N 3/08 |
| 2019/0122141 | A1* | 4/2019 | Zhen | G06N 20/00 |
| 2019/0244139 | A1* | 8/2019 | Varadarajan | G06N 20/10 |
| 2019/0318248 | A1* | 10/2019 | Moreira-Matias | G06N 20/00 |

OTHER PUBLICATIONS

Koch et al. "Automated Hyperparameter Tuning for Effective Machine Learning," SAS Institute Inc., 23 pages, 2017.
Thornton et al., "Auto-WEKA: Combined Selection and Hyperparameter Optimization of Classification Algorithms" arXiv:1208.3719v2, Sep. 18, 2012, pp. 847-855.
Kotthoff et al., "Auto-WEKA 2.0: Automatic model selection and hyperparameter optimization in WEKA," 18 J. Mach. Learning Res, 1, 2016.
Bergstra et al., "Random Search for Hyper-Parameter Optimization," Journal of Machine Learning Research 13, pp. 281-305, 2012.
Michael D. McKay, WSC '92 Proceedings of the 24th conference on Winter simulation, pp. 557-564, Dec. 13, 1992.
Dewancker et al., A Stratified Analysis of Bayesian Optimization Methods, arXiv:1603.09441v1 [cs.LG], Mar. 31, 2016.
Wujek et al., Best Practices for Machine Learning Applications, Available Jun. 26, 2017, pp. 1-21.
Gomes et al., Combining Meta-Learning and Search Techniques to Select Parameters for Support Vector Machines, Neurocomputing, Mar. 18, 2011.
Sacks et al., Design and Analysis of Computer Experiments, Statistical Science, vol. 4, No. 4, Nov. 1989, pp. 409-423.
Lorena et al., Evolutionary Tuning of SVM Parameter Values in Multiclass Problems, Neurocomputing 71, Jul. 16, 2008, pp. 3326-3334.
Sutskever et al., On the importance of initialization and momentum in deep learning, Proceedings of the 30th International Conference on Machine Learning, Atlanta, Georgia, 2013.
Bottou et al., Optimization Methods for Large-Scale Machine Learning, arXiv:1606.04838v2 [stat.ML], Jun. 15, 2016.
Renukadevi et al., Performance Analysis of Optimization Techniques for Medical Image Retrieval, Journal of Theoretical and Applied Information Technology, vol. 59, No. 2, Jan. 20, 2014, pp. 390-399.
D. Wolpert, The Lack of a Priori Distinctions Between Learning Algorithms, Neural Computation 8,, 1996, pp. 1341-1390.
LeCun et al., The MNIST Database of Handwritten Digits, http://yann.lecun.com/exdb/mnist/, Accessed Apr. 8, 2016.
Konen et al., Tuned Data Mining: A Benchmark Study on Different Tuners, In Proceedings of the 13th Annual Conference on Genetic and Evolutionary Computation, Jul. 12, 2011, pp. 1995-2002.
Auto-WEKA, Available Jun. 5, 2017.
Weka (machine learning), Available Mar. 22, 2017.
Hyperopt, Available Jun. 9, 2017.
LIBSVM—A Library for Support Vector Machines, https://www.csie.ntu.edu.tw/~cjlin/libsvm/, Available Jun. 5, 2017.
LIBSVM—Wikipedia, https://en.wikipedia.org/wiki/LIBSVM, Available Apr. 10, 2017.
GitHub—mlr-org/mlr: mlr: Machine Learning in R, https://github.com/mlr-org/mlr?_sm_au_=iVV31J5w7f4vfk5N, Available Jun. 9, 2017.
R (programming language)—Wikipedia, https://en.wikipedia.org/wiki/R_(programming_language), Available Jun. 8, 2017.
MOE, Available Jun. 9, 2017.
3.2. Tuning the hyper-parameters of an estimator, Available Jun. 9, 2017.
Sklearn.grid_search.RandomizedSearchCV, Available Jun. 9, 2017.
Scikit-learn, https://en.wikipedia.org/w/index.php?title=Scikit-oldid=778660797, Available May 4, 2017.
About SigOpt, Available Jun. 9, 2017.
Spearmint, Available Jun. 9, 2017.
SUMO—SUrrogate MOdeling Lab, Available Jun. 5, 2017.
Surrogate model, https://en.wikipedia.org/w/index.php?title=Surrogate_model&oldid=772207388, Available Mar. 25, 2017.
TPOT, Available Jun. 5, 2017.
SAS Institute Inc. 2016. SAS/OR® 14.2 User's Guide: Local Search Optimization. Cary, NC: SAS Institute Inc., Nov. 2016.
Gray et al., Hybrid Optimization Schemes for Simulation-Based Problems, Procedia Computer Science 1, 2012, pp. 1349-1357.
Gray, G. A., and Fowler, K. R. (2011). "The Effectiveness of Derivative-Free Hybrid Methods for Black-Box Optimization." International Journal of Mathematical Modeling and Numerical Optimization 2:112-133.
Gray, G. A., and Kolda, T. G. (2006). "Algorithm 856: APPSPACK 4.0—Asynchronous Parallel Pattern Search for Derivative-Free Optimization." ACM Transactions on Mathematical Software 32:485-507.
Griffin, J. D., Fowler, K. R., Gray, G. A., and Hemker, T. (2011). "Derivative-Free Optimization via Evolutionary Algorithms Guiding Local Search (EAGLS) for MINLP." Pacific Journal of Optimization 7:425-443.
Griffin, J. D., and Kolda, T. G. (2010a). "Asynchronous Parallel Hybrid Optimization Combining DIRECT and GSS." Optimization Methods and Software 25:797-817.
Griffin, J. D., and Kolda, T. G. (2010b). "Nonlinearly Constrained Optimization Using Heuristic Penalty Methods and Asynchronous Parallel Generating Set Search." Applied Mathematics Research Express 2010:36-62.
Griffin, J. D., Kolda, T. G., and Lewis, R. M. (2008). "Asynchronous Parallel Generating Set Search for Linearly Constrained Optimization." SIAM Journal on Scientific Computing 30:1892-1924.
Kolda, T. G., Lewis, R. M., and Torczon, V. (2003). "Optimization by Direct Search: New Perspectives on Some Classical and Modern Methods." SIAM Review 45:385-482.
Taddy, M. A., Lee, H. K. H., Gray, G. A., and Griffin, J. D. (2009). "Bayesian Guided Pattern Search for Robust Local Optimization." Technometrics 51:389-401.
Raschka, Sebastian, "Model evaluation, model selection, and algorithm selection in machine learning Part III—Cross-validation and hyperparameter tuning," 2016, pp. 24, https://sebastianraschka.com/blog/2016/model-evaluation-selection-part3.html.
Plantenga, T. (2009). HOPSPACK 2.0 User Manual (v 2.0.2). Technical report, Sandia National Laboratories.
SAS Institute Inc. 2017. SAS® Visual Data Mining and Machine Learning 8.1: Programming Guide. Cary, NC: SAS Institute Inc., Mar. 2017.
SAS Institute Inc. 2017. SAS® Visual Data Mining and Machine Learning 8.1: Data Mining and Machine Learning Procedures. Cary, NC: SAS Institute Inc., Mar. 2017.

* cited by examiner

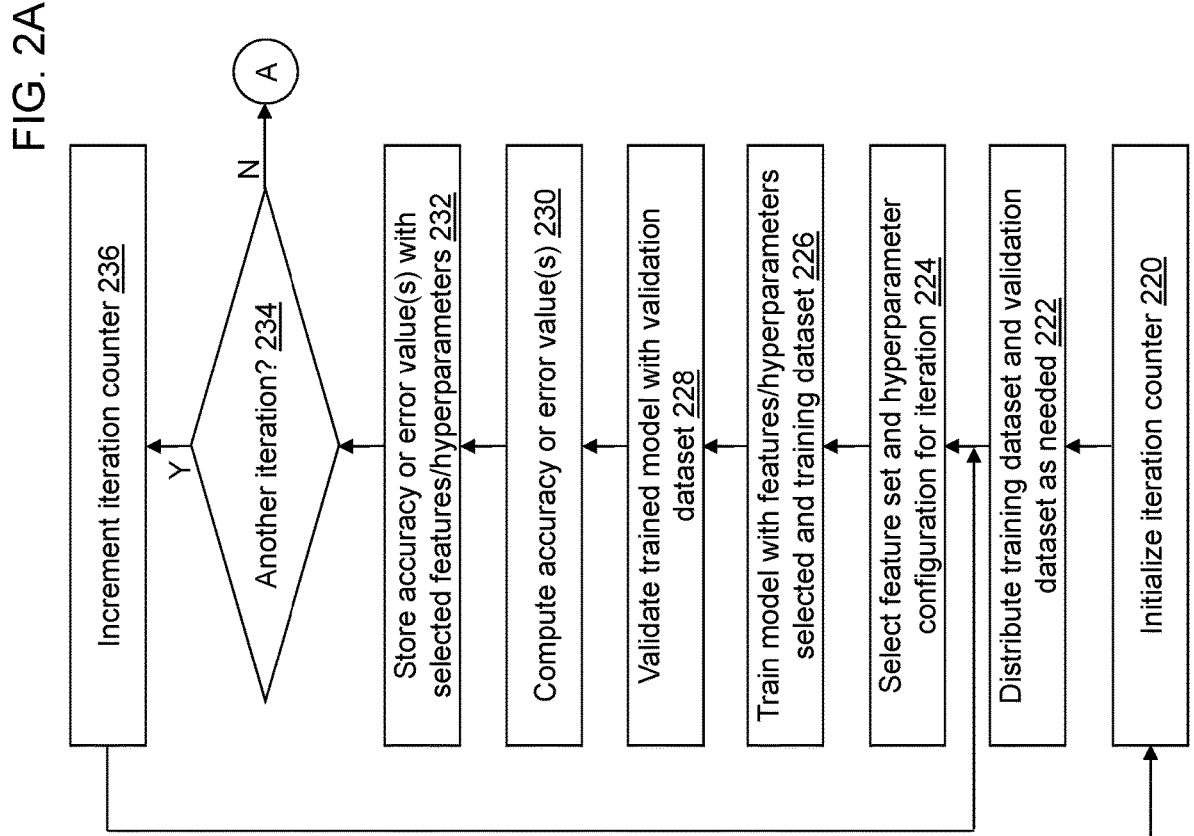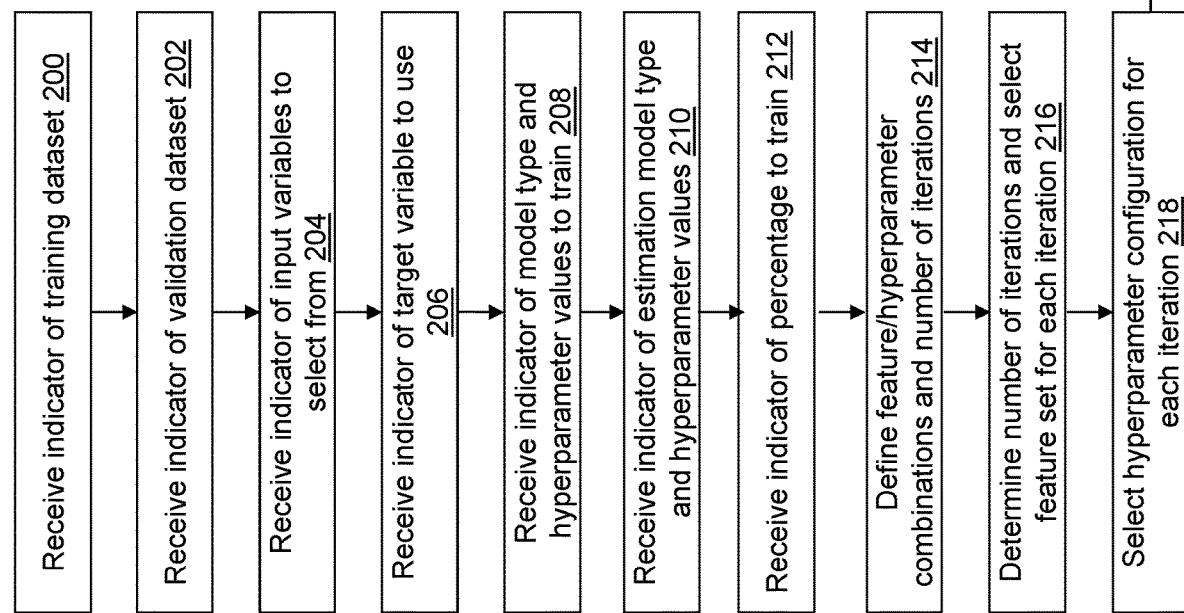

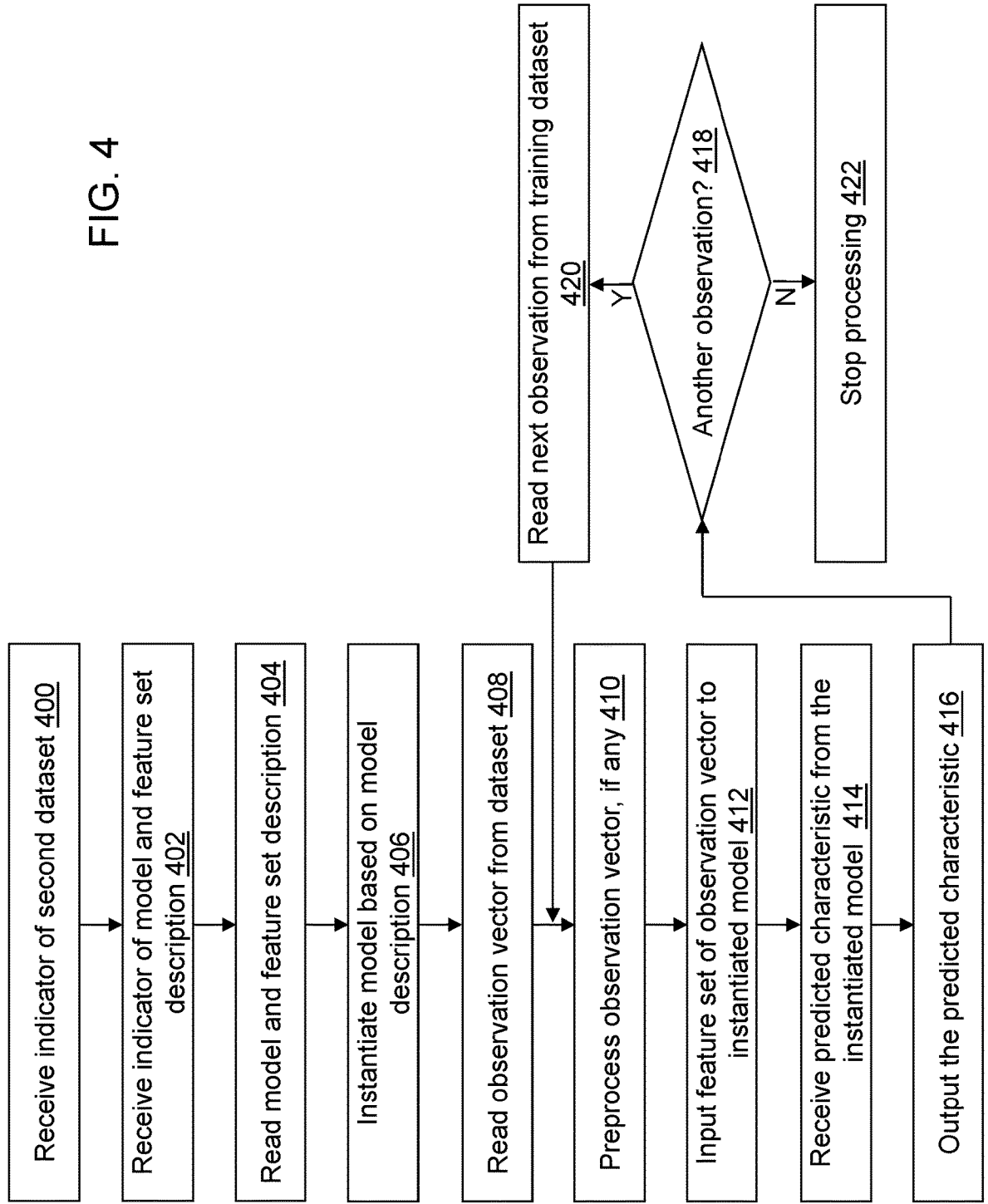

SYSTEM FOR AUTOMATIC, SIMULTANEOUS FEATURE SELECTION AND HYPERPARAMETER TUNING FOR A MACHINE LEARNING MODEL

CROSS-REFERENCE TO RELATED APPLICATIONS

The present application claims priority to and the benefit of 35 U.S.C. § 119(e) to U.S. Provisional Patent Application No. 62/679,581 filed on Jun. 1, 2018, the entire contents of which are hereby incorporated by reference. The present application also claims priority to and the benefit of 35 U.S.C. § 119(e) to U.S. Provisional Patent Application No. 62/712,756 filed on Jul. 31, 2018, the entire contents of which are hereby incorporated by reference.

BACKGROUND

Training accurate machine learning models involves two challenges. The first challenge is to provide the model with a good set of input variables (feature set), which currently involves using various feature selection, feature extraction, and feature engineering techniques. For each set of candidate features, the best way to check if it improves the prediction accuracy is to retrain the model and determine if a cross validation error decreases or a validation error decreases or an accuracy increases. The second challenge is to select the hyperparameters used to train the model. The selection of the feature set and the hyperparameters has a tremendous effect on the prediction accuracy of the resulting model. Both tasks are challenging and computationally expensive because they require repeated training of different models in high-dimensional spaces.

SUMMARY

In an example embodiment, a non-transitory computer-readable medium is provided having stored thereon computer-readable instructions that, when executed by a computing device, cause the computing device to select a feature set and hyperparameters for a machine learning model to predict a value for a characteristic in a second dataset. A plurality of feature sets to evaluate for input to a machine learning model are defined. Each feature set of the plurality of feature sets uniquely indicates a plurality of variables. Each of the plurality of variables are a subset of a second plurality of variables included in an input dataset. A plurality of hyperparameter configurations to evaluate for input to the machine learning model are defined. Each hyperparameter configuration of the plurality of hyperparameter configurations indicates a value for each hyperparameter of a plurality of hyperparameters associated with a model type of the machine learning model. Each hyperparameter configuration of the plurality of hyperparameter configurations is unique. A number of training model iterations is determined based on a number of the defined plurality of feature sets and a number of the defined plurality of hyperparameter configurations. A unique evaluation pair is selected for each of the determined number of training model iterations. Each evaluation pair indicates a feature set selected from the defined plurality of feature sets and a hyperparameter configuration selected from the defined plurality of hyperparameter configurations. (a) A current feature set is selected based on the feature set of the unique evaluation pair selected for a current iteration number. (b) A current hyperparameter configuration is selected based on the hyperparameter configuration of the unique evaluation pair selected for the current iteration number. (c) A machine learning model of the model type is trained using features selected from a training dataset based on the selected current feature set and the selected current hyperparameter configuration. (d) The trained machine learning model is validated using features selected from a validation dataset based on the selected current feature set and the selected current hyperparameter configuration to compute a performance measure value. (e) The computed performance measure value and an indicator of the selected current feature set and the selected current hyperparameter configuration are stored. (f) The current iteration number is incremented. (a) to (f) are repeated until each of the determined number of training model iterations has been performed. An estimation model is trained using the feature set, the hyperparameter configuration, and the performance measure value stored for each iteration as inputs. The trained estimation model is executed to compute the performance measure value for each feature set of the defined plurality of feature sets in combination with each hyperparameter configuration of the defined plurality of hyperparameter configurations. A final feature set and a final hyperparameter configuration are selected based on the computed performance measure value. The selected final feature set and final hyperparameter configuration are output to predict a value for a characteristic of a new observation vector.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to select a feature set and hyperparameters for a machine learning model to predict a value for a characteristic in a second dataset.

In yet another example embodiment, a method of selecting a feature set and hyperparameters for a machine learning model to predict a value for a characteristic in a second dataset is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2A and 2B depict a flow diagram illustrating examples of operations performed by the model training device of FIG. 1 in accordance with an illustrative embodiment.

FIG. 4 depicts a flow diagram illustrating examples of operations performed by the prediction device of FIG. 3 in accordance with an illustrative embodiment.

DETAILED DESCRIPTION

A goal of feature engineering is to provide a machine learning model with a good set of features from which to train. Better features provide flexibility, simpler models, and improved prediction accuracy. Feature engineering often involves using various techniques, including feature selection, feature extraction, and feature derivation. Searching through all possible feature engineering techniques for each feature is computationally very expensive, especially if a dataset has a large number of features.

A goal of hyperparameter tuning is to find good hyperparameter values for a machine learning algorithm used to train the machine learning model. Most machine learning algorithms include a large number of hyperparameters, which include regularization parameters, stochastic gradient descent parameters (such as learning rate and momentum), as well as other algorithm-specific parameters such as a maximum depth of a tree and a subsampling rate for a decision tree based machine learning model. The regularization parameters, stochastic gradient descent parameters (such as learning rate and momentum), as well as the other algorithm-specific parameters, among other parameters, are referred to herein as "hyperparameters" that are defined by a user to control execution of a predictive model using various model types such as a neural network model type, a gradient boosting tree model type, a decision tree model type, a forest model type, a support vector machine model type, etc. Different hyperparameters are used based on the type of predictive model.

The hyperparameters have a significant effect on a prediction accuracy of the resulting models with no clear default values that apply to different datasets. A traditional way of performing a hyperparameter search is manual tuning. However, manual tuning is less likely to yield an optimal solution. Another commonly used technique is grid search, which comprises trying all possible values of the hyperparameters and choosing the set of hyperparameters that yield a minimum prediction error or a maximum accuracy measure. The minimum prediction error and the maximum accuracy measure may be referred to as a performance measure value. Grid search, however, can become computationally infeasible very quickly as the number of hyperparameters increases.

Figure 1:
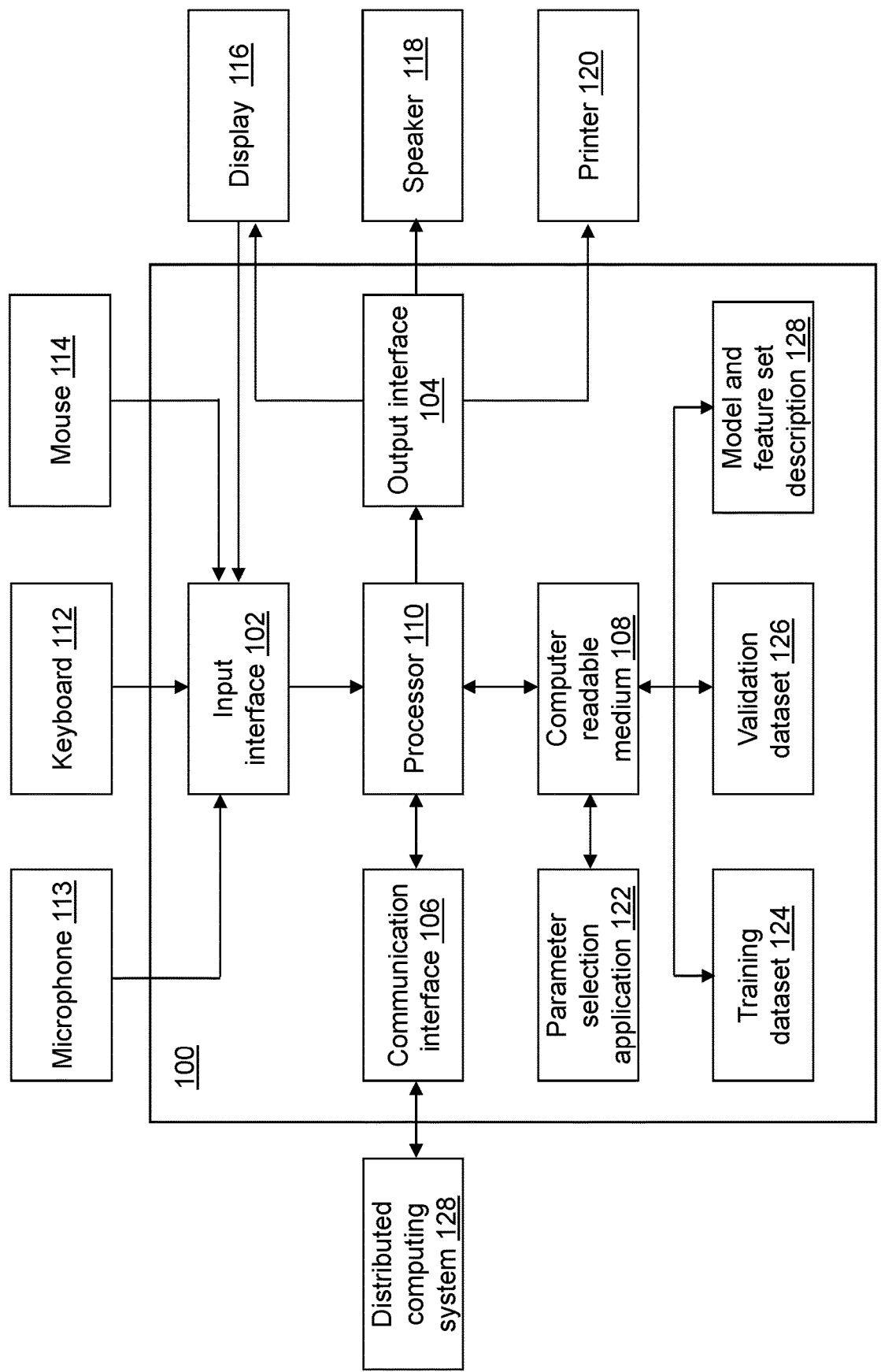
FIG. 1 depicts a block diagram of a model training device in accordance with an illustrative embodiment.

Referring to FIG. 1, a block diagram of a model training device 100 is shown in accordance with an illustrative embodiment. Model training device 100 may include an input interface 102, an output interface 104, a communication interface 106, a non-transitory computer-readable medium 108, a processor 110, a parameter selection application 122, a training dataset 124, a validation dataset 126, and a model and feature set description 128. Fewer, different, and/or additional components may be incorporated into model training device 100.

Parameter selection application 122 automatically combines feature selection and hyperparameter tuning for supervised machine learning algorithms used to train models of various types. A fraction (e.g., ~5%) of a total set of combinations of pairs of feature sets and hyperparameter configurations are randomly selected. A model of a selected model type is trained using each selected pair of feature sets and hyperparameter configurations and training dataset 124. Validation dataset 126 is used to compute a prediction accuracy value or an error value using each trained model. A prediction accuracy value or an error value of a model of the model type for the remaining pairs (e.g., ~95%) are estimated using a selected estimation model trained with the computed prediction accuracy value or error value generated by validating each trained model. The trained model and its corresponding feature set and hyperparameter configuration that result in a highest prediction accuracy value or a lowest error value is selected as a final trained model for use in predicting or characterizing a value for an observation vector in a second dataset 324 (shown referring to FIG. 3).

Input interface 102 provides an interface for receiving information from the user or another device for entry into model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into model training device 100 or to make selections presented in a user interface displayed on display 116. The same interface may support both input interface 102 and output interface 104. For example, display 116 comprising a touch screen provides a mechanism for user input and for presentation of output to the user. Model training device 100 may have one or more input interfaces that use the same or a different input interface technology. The input interface technology further may be accessible by model training device 100 through communication interface 106.

Output interface 104 provides an interface for outputting information for review by a user of model training device 100 and/or for use by another application or device. For example, output interface 104 may interface with various output technologies including, but not limited to, display 116, a speaker 118, a printer 120, etc. Model training device 100 may have one or more output interfaces that use the same or a different output interface technology. The output interface technology further may be accessible by model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model training device 100 may have one or more communication interfaces that use the same or a different communication interface technology. For example, model training device 100 may support communication using an Ethernet port, a Bluetooth antenna, a telephone jack, a USB port, etc. Data and messages may be transferred between model training device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model training device 100 also may have one or more drives that support the loading of a memory media such as a CD, DVD, an external hard drive, etc. One or more external hard drives further may be connected to model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model training device 100 may include a plurality of processors that use the same or a different processing technology. For example, model training device 100 may include a plurality of processors that support parallel processing, for example, using a plurality of threads.

Parameter selection application 122 performs operations associated with defining model and feature set description 128 from data stored in training dataset 124. Model and feature set description 128 may be used to classify, to predict and/or to monitor data from data stored in second dataset 324. The predicted or classification date may be stored in a predicted dataset 326 (shown referring to FIG. 3) to support various data analysis functions as well as provide alert/messaging related to the monitored data. Some or all of the operations described herein may be embodied in parameter selection application 122. The operations may be implemented using hardware, firmware, software, or any combination of these methods.

Referring to the example embodiment of FIG. 1, parameter selection application 122 is implemented in software (comprised of computer-readable and/or computer-executable instructions) stored in computer-readable medium 108 and accessible by processor 110 for execution of the instructions that embody the operations of parameter selection application 122. Parameter selection application 122 may be written using one or more programming languages, assembly languages, scripting languages, etc. Parameter selection application 122 may be integrated with other analytic tools. As an example, parameter selection application 122 may be part of an integrated data analytics software application and/or software architecture such as that offered by SAS Institute Inc. of Cary, N.C., USA. For example, parameter selection application 122 may be implemented using or integrated with one or more SAS software tools such as SAS® Enterprise Miner™, SAS® Factory Miner, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Event Stream Processing (ESP) all of which are developed and provided by SAS Institute Inc. of Cary, N.C., USA. Data mining and data analytics is applicable in a wide variety of industries.

Parameter selection application 122 may be integrated with other system processing tools to automatically process data generated as part of operation of an enterprise, device, system, facility, etc., to identify any outliers in the processed data, to monitor changes in the data, and to provide a warning or alert associated with the monitored data using input interface 102, output interface 104, and/or communication interface 106 so that appropriate action can be initiated in response to changes in the monitored data.

Parameter selection application 122 may be implemented as a Web application. For example, parameter selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 and validation dataset 126 may be partitioned from an input dataset with or without replacement, for example, based on a selection of a percent of the input dataset allocated to training dataset 124 to use for training the model with a remainder allocated to validation dataset 126 to validate a performance of the trained model. For illustration, a cross validation option may be selected by a user or other technique for determining training dataset 124 and validation dataset 126 from the input dataset. Training dataset 124 and validation dataset 126 each may include, for example, a plurality of rows and a plurality of columns. The plurality of rows may be referred to as observation vectors or records (observations), and the columns may be referred to as variables or features. Training dataset 124 and validation dataset 126 may be transposed. The plurality of variables $v_i$ may define multiple dimensions for each observation vector of training dataset 124 and validation dataset 126. An observation vector $x_i$ may include a value for each of the plurality of variables $v_i$ associated with the observation i, where i=1, . . . , $N_T$, where $N_T$ is a number of observations in training dataset 124. An observation vector $x_{vi}$ may include a value for each of the plurality of variables $v_i$ associated with the observation i, where i=1, . . . , $N_V$, where $N_V$ is a number of observations in validation dataset 126.

Each variable of the plurality of variables $v_i$ may describe a characteristic of a physical object. For example, if the input dataset includes data related to operation of a vehicle, the variables may include an oil pressure, a speed, a gear indicator, a gas tank level, a tire pressure for each tire, an engine temperature, a radiator level, etc. The input dataset may include data captured as a function of time for one or more physical objects. Each observation vector $x_i$ includes observation vector values $o_{i,j}$, where j=1, . . . , $N_f$ and i=1, . . . , N, where $N_f$ is a number of the plurality of variables $v_i$ that make up each observation vector in the input dataset though some values may be missing. Associated with each observation vector $x_i$ is a target variable value $y_i$, where i=1, . . . , $N_T$ or i=1, . . . , $N_V$. Less than all of the columns of the input dataset may be used as variables that define each observation vector $x_i$ or target variable value $y_i$ used to define model and feature set description 128. Thus, the input dataset may include greater than $N_f$ columns.

The data stored in the input dataset may be generated by and/or captured from a variety of sources including one or more sensors of the same or different type, one or more computing devices, etc. One or more columns of data stored in the input dataset further may be computed from a value of one or more other variables included in the input dataset. One or more columns of data stored in the input dataset further may be computed using various feature engineering techniques such as principal component analysis to define new features that have been included in the input dataset. As a result, the data stored in the input dataset may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA to compute values for new variables.

The data stored in the input dataset may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in the input dataset may be captured at different time points periodically, intermittently, when an event occurs, etc. One or more variables of the input dataset may include a time and/or a date value.

The input dataset may include data captured under normal and/or abnormal operating conditions of the physical object. The input dataset may include data captured at a high data rate such as 200 or more observations per second for one or more physical objects. For example, data stored in the input dataset may be generated as part of the Internet of Things (IoT), where things (e.g., machines, devices, phones, sensors, smart meters for energy, personal wearable devices, health monitoring devices, autonomous vehicle devices, robotic components, identification devices, etc.) can be connected to networks and the data from these things collected and processed within the things and/or external to the things before being stored in the input dataset that is split or partitioned into training dataset 124 and validation dataset 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in the input dataset.

Training dataset 124 and validation dataset 126 may be stored on computer-readable medium 108 and/or on one or more computer-readable media of distributed computing system 128 and accessed by model training device 100 using communication interface 106, input interface 102, and/or output interface 104. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

The input dataset may be stored using various data structures as known to those skilled in the art including one or more files of a file system, a relational database, one or more tables of a system of tables, a structured query language database, etc. on model training device 100 and/or on distributed computing system 128 that may be the same or different. Model training device 100 may coordinate access to training dataset 124 and validation dataset 126 that are distributed across distributed computing system 128 that may include one or more computing devices. For example, training dataset 124 and validation dataset 126 may be stored in cubes distributed across a grid of computers as understood by a person of skill in the art. As another example, training dataset 124 and validation dataset 126 may be stored in a multi-node Hadoop® cluster. For instance, Apache™ Hadoop® is an open-source software framework for distributed computing supported by the Apache Software Foundation. As another example, training dataset 124 and validation dataset 126 may be stored in a cloud of computers and accessed using cloud computing technologies, as understood by a person of skill in the art. The SAS® LASR™ Analytic Server may be used as an analytic platform to enable multiple users to concurrently access data stored in training dataset 124 and validation dataset 126. The SAS® Viya™ open, cloud-ready, in-memory architecture also may be used as an analytic platform to enable multiple users to concurrently access data stored in the input dataset, training dataset 124, and/or validation dataset 126. Some systems may use SAS In-Memory Statistics for Hadoop® to read big data once and analyze it several times by persisting it in-memory for the entire session. Some systems may be of other types and configurations.

Figure 2B:
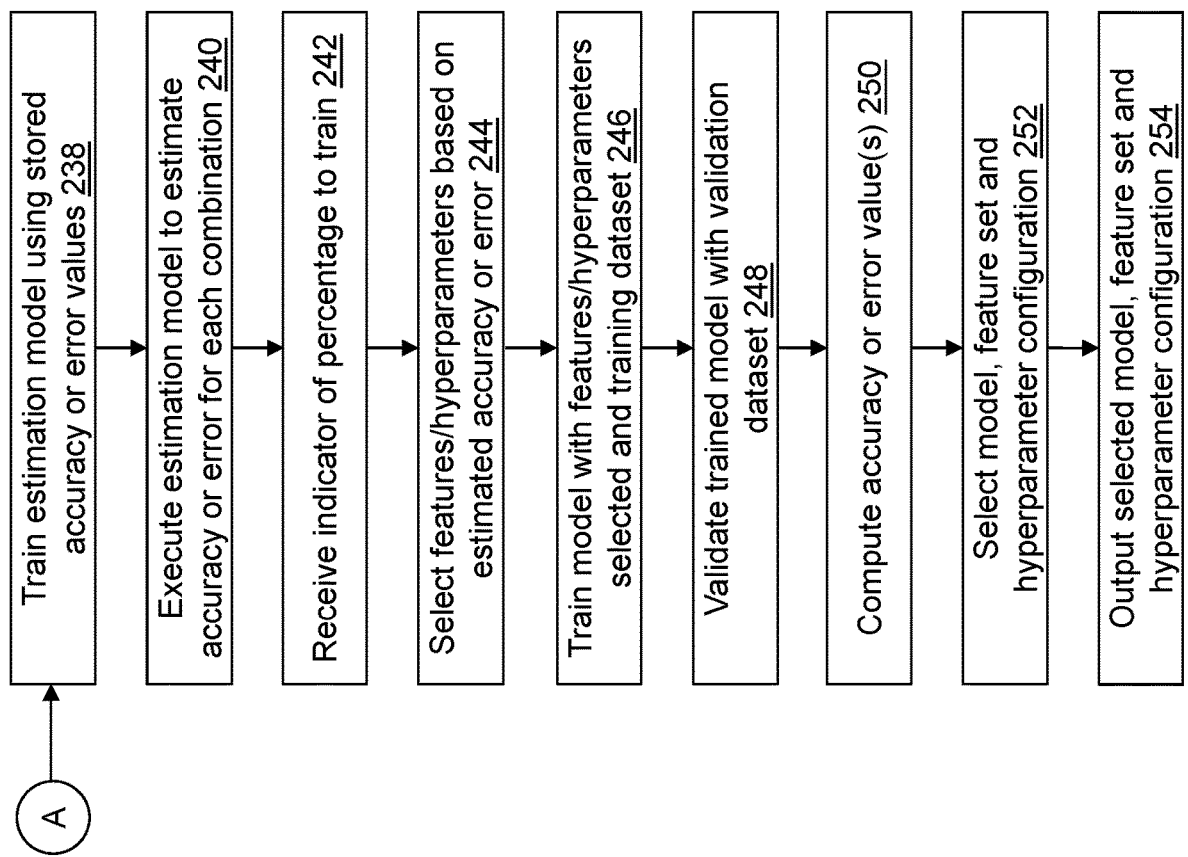

Referring to FIGS. 2A and 2B, example operations associated with parameter selection application 122 are described. For example, parameter selection application 122 may be used to create model and feature set description 128 from training dataset 124. Additional, fewer, or different operations may be performed depending on the embodiment of parameter selection application 122. The order of presentation of the operations of FIGS. 2A and 2B is not intended to be limiting. Although some of the operational flows are presented in sequence, the various operations may be performed in various repetitions, concurrently (in parallel, for example, using threads and/or distributed computing system 128), and/or in other orders than those that are illustrated. For example, a user may execute parameter selection application 122, which causes presentation of a first user interface window, which may include a plurality of menus and selectors such as drop down menus, buttons, text boxes, hyperlinks, etc. associated with parameter selection application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by parameter selection application 122.

Referring to FIG. 2A, in an operation 200, a first indicator may be received that indicates training dataset 124. For example, the first indicator indicates a location and a name of training dataset 124. As an example, the first indicator may be received by parameter selection application 122 after selection from a user interface window or after entry by a user into a user interface window. In an alternative embodiment, training dataset 124 may not be selectable. For example, a most recently created dataset may be used automatically. For example, a grid, a cube, a cloud, a Hadoop® cluster, a relational database, a file system, etc. location may be used automatically as a location/name of training dataset 124.

In an operation 202, a second indicator may be received that indicates validation dataset 126. For example, the second indicator indicates a location and a name of validation dataset 126. As an example, the second indicator may be received by parameter selection application 122 after selection from a user interface window or after entry by a user into a user interface window. In an alternative embodiment, validation dataset 126 may not be selectable. For example, a most recently created dataset may be used automatically. For example, a grid, a cube, a cloud, a Hadoop® cluster, a relational database, a file system, etc. location may be used automatically as a location/name of validation dataset 126. Alternatively, the input dataset from which training dataset 124 and validation dataset 126 are selected may be indicated. Training dataset 124 and validation dataset 126 may be selected from the input dataset based on criteria specified by a user such as a cross validation criteria, a sampling percentage, a sampling type, etc.

In an operation 204, a third indicator may be received that indicates a plurality of variables $v_i$ also referred to as features associated with each of training dataset 124 and of validation dataset 126 to define each observation vector $x_i$, where i=1, . . . , $N_T$ for training dataset 124 and i=, . . . , $N_V$ for validation dataset 126. The third indicator may indicate that all or only a subset of the variables stored in each of training dataset 124 and of validation dataset 126 be used to evaluate for use in defining model and feature set description 128. For example, the third indicator indicates a list of variables to use by name, column number, etc. In an alternative embodiment, the third indicator may not be received. For example, all of the variables except the last variable may be used automatically. The third indicator may define the plurality of variables for each of training dataset 124 and of validation dataset 126 in the same or a different manner though the set of the plurality of variables $v_i$ is common to each.

In an operation 206, a fourth indicator may be received that indicates a target variable (column) associated with each of training dataset 124 and of validation dataset 126 to define the target variable vector $y_i$, where i=1, . . . , $N_T$ for training dataset 124 and i=1, . . . , $N_V$ for validation dataset 126. The target variable may be a label or other value that is considered to result from the associated observation vector values such as a characteristic associated with the observation vector values. For example, the fourth indicator indicates a target variable to use by name, column number, etc. In an alternative embodiment, the fourth indicator may not be received. For example, the last variable in training dataset 124 and in validation dataset 126 may be used automatically. The fourth indicator may define the target variable for each of training dataset 124 and validation dataset 126 in the same or a different manner though the target variable is common to each of training dataset 124 and validation dataset 126.

In an operation 208, a fifth indicator of a model type to train and hyperparameters values to evaluate as part of the training may be received. For example, the fifth indicator may indicate a name of a model type. The fifth indicator may be received by parameter selection application 122 after selection from a user interface window or after entry by a user into a user interface window. As an example, a model type may be selected from "Decision Tree", "Factorization Machine", "Forest", "Gradient Boosting Tree", "Neural Network", "Support Vector Machine", etc. Of course, the model type may be labeled or selected in a variety of different manners by the user as understood by a person of skill in the art. In an alternative embodiment, the model type may not be selectable, and a single model type is implemented in parameter selection application 122. The fifth indicator may further indicate values for one or more optimization parameters to indicate when training is complete for the model type such as a maximum number of configuration evaluations, a maximum number of iterations, a maximum time, etc.

The Decision Tree model type may include decision tree hyperparameters to train a decision tree model for minimum error as measured by an objective function. The decision tree hyperparameters and the objective function may be indicated using the fifth indicator also. For illustration, a dtreeTrain action, optionally a dtreePrune action, and a dtreeScore action (an assess action may be run after each dtreeScore action) may be used to train and validate a decision tree model to compute a validation error. For illustration, the dtreeTrain action, the dtreePrune action, and the dtreeScore action are included in SAS® Viya™ and SAS® Cloud Analytic Services (CAS) developed and provided by SAS Institute Inc. of Cary, N.C., USA.

The Forest model type may include forest hyperparameters to train a Forest model for minimum error as measured by a specified objective function. The forest hyperparameters and the objective function may be indicated using the fifth indicator also. The Forest model type creates a decision tree recursively by choosing an input variable and using it to create a rule to split the data into two or more subsets. The process is repeated in each subset, and again in each new subset, and so on until a constraint is met. In the terminology of the tree metaphor, the subsets are nodes, the original data table is a root node, and final unpartitioned subsets are leaves or terminal nodes. A node is an internal node if it is not a leaf. The data in a leaf determine estimates of the value of the target variable. These estimates are subsequently applied to predict the target of a new observation that is assigned to the leaf.

For illustration, a FOREST procedure included in SAS® Visual Data Mining and Machine Learning developed and provided by SAS Institute Inc. of Cary, N.C., USA may be used to implement the forest model type in SAS Viya. The FOREST procedure creates a predictive model called a forest, which consists of several decision trees, in SAS Viya. The FOREST procedure creates multiple decision trees that differ from each other in two ways: 1) the training data for each tree constitutes a different sample, and each sample is created by sampling, with replacement, observations from the original training data of the forest, and 2) the input variables that are considered for splitting a node are randomly selected from all available inputs. Among these randomly selected variables, the FOREST procedure chooses a single variable, which is associated the most with the target variable when it forms a splitting rule. The FOREST procedure creates an ensemble of decision trees to predict a single target variable value of either interval or nominal measurement level. An input variable can have an interval or a nominal measurement level. For illustration, a forestTrain action and a forestScore action may be used to train and validate a forest model to compute a validation error. For illustration, the forestTrain action and the forestScore action are included in SAS Viya and SAS CAS.

The Factorization Machine model type may include factorization machine hyperparameters to train a factorization machine model for minimum error as measured by a specified objective function. The factorization machine hyperparameters and the objective function may be indicated using the fifth indicator also. For illustration, a FACTMAC procedure included in SAS Visual Data Mining and Machine Learning may be used to implement the factorization machine model type in SAS Viya. The Factorization Machine model type generalizes a matrix factorization. The FACTMAC procedure estimates factors for each of the nominal input variables specified, in addition to estimating a global bias and a bias for each level of the nominal input variables. An interval type target variable is used. The FACTMAC procedure computes the biases and factors by using a stochastic gradient descent (SGD) algorithm that minimizes a root mean square error (RMSE) criterion. For illustration, a factmac action of the factmac action set, a score action of the astore action set, and an assess action of the percentile action set may be used to train and validate a factorization machine model to compute a validation error. For illustration, the factmac action, the score action, and the assess action are included in SAS Viya and SAS CAS.

The Gradient Boosting Tree model type may include gradient boosting tree hyperparameters to train a gradient boosting tree model for minimum error as measured by a specified objective function. The gradient boosting tree hyperparameters and the objective function may be indicated using the fifth indicator also. The Gradient Boosting Tree model type consists of multiple decision trees. For illustration, a GRADBOOST procedure included in SAS Visual Data Mining and Machine Learning may be used to implement the Gradient Boosting Tree model type in SAS Viya. The GRADBOOST procedure creates a predictive model called a gradient boosting tree model in SAS Viya. The GRADBOOST procedure creates a predictive model by fitting a set of additive trees. For illustration, a gbtreeTrain action and a gbtreeScore action may be used to train and validate a gradient boosting tree model to compute a validation error. For illustration, the gbtreeTrain and gbtreeScore actions included in the decision Tree action set of SAS Viya and SAS CAS.

The Neural Network model type may include neural network hyperparameters to train a neural network model for minimum error as measured by a specified objective function. The neural network hyperparameters and the objective function may be indicated using the fifth indicator also. For illustration, a NNET procedure included in SAS Visual Data Mining and Machine Learning may be used to implement the Neural Network model type in SAS Viya. The NNET procedure trains a multilayer perceptron neural network. Training a multilayer perceptron neural network relies on an unconstrained minimization of a nonlinear objective function. For illustration, an annTrain action and an annScore action may be used to train and validate a neural network model to compute a validation error. For illustration, the annTrain and annScore actions are included in the neuralNet action set of SAS Viya and SAS CAS.

The Support Vector Machine model type may include support vector machine hyperparameters to train a support vector machine model for minimum error as measured by a specified objective function. The support vector machine hyperparameters and the objective function may be indicated using the fifth indicator also. For illustration, a SVMACHINE procedure included in SAS Visual Data Mining and Machine Learning may be used to implement the Support Vector Machine model type in SAS Viya. The Support Vector Machine model type computes support vector machine learning classifiers for a binary pattern recognition problem. The SVMACHINE procedure uses both linear and low-degree polynomial kernels to conduct the computation. For illustration, a svm Train action of the svm action set, the score action of the astore action set, and the assess action of the percentile action may be used to train and validate a neural network model to compute a validation error. For illustration, the svm Train action is included in the svm action set of SAS Viya and SAS CAS.

Using the fifth indicator, the user may identify one or more of the hyperparameters to exclude from the evaluation such that a single value is used for that hyperparameter when selecting values for each hyperparameter configuration. When a hyperparameter is excluded, a default value defined for the hyperparameter may be used for each hyperparameter configuration or a value may be specified by the user using the fifth indicator. Using the fifth indicator, the user may select one or more of the hyperparameters to evaluate using a lower bound value, an upper bound value, and an iteration value. Using the fifth indicator, the user may identify one or more of the hyperparameters to evaluate using a list of possible values instead of a range of values. Using the fifth indicator, the user may identify one or more of the hyperparameters to evaluate using default bounds and initial values. The methodology by which evaluation values are determined for each hyperparameter may be defined using the fifth indicator, for example, using the lower bound value, the upper bound value, and the iteration value for each hyperparameter or a list of possible values.

For example, the decision tree model type hyperparameters may include a maximum number of decision tree levels, a number of bins to use for numeric variables during calculation of the decision tree, and a split criterion for each tree node. A value for each of these hyperparameters is defined in each hyperparameter configuration for the decision tree model type.

For example, the factorization machine model type hyperparameters may include a number of factors, a learning step, and a maximum number of iterations. A value for each of these hyperparameters is defined in each hyperparameter configuration for the factorization machine model type.

For example, the forest model type hyperparameters may include a fraction value of a random bootstrap sample of the training data to be used for growing each tree in the forest, where the fraction value has a value between 0 and 1. The forest model type hyperparameters further may include a maximum depth of a decision tree to be grown where a number of levels in a tree is equal to a depth value plus one. The forest model type hyperparameters further may include a number of trees to grow. The forest model type hyperparameters further may include a number of input variables to consider splitting on in a node, where the value is between one and the number of variables $N_f$ of the plurality of variables $v_i$ indicated in operation 204. A value for each of these hyperparameters is defined in each hyperparameter configuration for the forest model type.

For example, the gradient boosting tree model type hyperparameters may include an L1 norm regularization parameter that is greater than or equal to zero. The gradient boosting tree model type hyperparameters further may include a learning rate that is between zero and one, inclusive. The gradient boosting tree model type hyperparameters further may include a number of trees to grow. The gradient boosting tree model type hyperparameters further may include an L2 norm regularization parameter that is greater than or equal to zero. The gradient boosting tree model type hyperparameters further may include a fraction of training dataset 124 to be used for growing each tree. The gradient boosting tree model type hyperparameters further may include a number of input variables to consider splitting on in a node where the value is between one and the number of variables $N_f$. A value for each of these hyperparameters is defined in each hyperparameter configuration for the gradient boosting tree model type.

For example, the neural network model type hyperparameters may include a range of an annealing rate to use when an SGD algorithm is used for training. The neural network model type hyperparameters further may include a learning rate when the SGD algorithm is used for training. The neural network model type hyperparameters further may include a number of hidden layers in the network. The neural network model type hyperparameters further may include tuning information for neurons in the ith hidden layer. The neural network model type hyperparameters further may include an L1 norm regularization parameter that is greater than or equal to zero. The neural network model type hyperparameters further may include an L2 norm regularization parameter that is greater than or equal to zero. A value for each of these hyperparameters is defined in each hyperparameter configuration for the neural network model type.

For example, the support vector machine model type hyperparameters may include a penalty value C that is greater than zero. The support vector machine model type hyperparameters further may include a degree value that may be between one and three, inclusive. A degree value equal to one is used in a linear kernel. The degree value equal to two or three is used in a polynomial kernel. A value for each of these hyperparameters is defined in each hyperparameter configuration for the support vector machine model type.

As already stated, the fifth indicator may indicate the objective function that may be a name of the objective function. The objective function specifies a measure of model error (performance) to be used to identify a best feature set and hyperparameter configuration among those evaluated. A default value for the objective function may further be stored, for example, in computer-readable medium 108. As an example, an objective function may be selected from "ASE", "AUC", "F05", "F1", "GAMMA", "GINI", "KS", "MAE", "MCE", "MCLL", "MISC", "MSE", "MSLE", "RASE", "RMAE", "RMSLE", "TAU", etc. Some values can be specified only when the target variable is of a particular type. For example, a default objective function may be the "MISC" objective function for nominal type target variables or "MSE" for interval type target variables. Of course, the objective function may be labeled or selected in a variety of different manners by the user as understood by a person of skill in the art. In an alternative embodiment, the objective function may not be selectable, and a single objective function is implemented in parameter selection application 122. For example, the "MISC" objective function may be used by default or without allowing a selection for nominal type target variables, and "MSE" may be used by default or without allowing a selection for interval type target variables.

ASE uses an average squared error as the objective function; AUC uses an area under a curve as the objective function (nominal type only); F05 uses a F0.5 coefficient as the objective function (nominal type only); F1 uses an F1 coefficient as the objective function (nominal type only); GAMMA uses a gamma coefficient as the objective function (nominal type only); GINI uses a Gini coefficient as the objective function (nominal type only); KS uses a Kolmogorov-Smirnov coefficient as the objective function (nominal type only); MAE uses a mean absolute error as the objective function (interval type only); MCE uses a misclassification rate as the objective function (nominal type only); MCLL uses a multiclass log loss as the objective function (nominal type only); MISC uses a misclassification error percentage as the objective function (nominal type only); MSE uses a mean squared error as the objective function (interval type only); MSLE uses a mean squared logarithmic error as the objective function (interval type only); RASE uses a root average squared error as the objective function; RMAE uses a root mean absolute error as the objective function (interval type only); RMSLE uses a root mean squared logarithmic error as the objective function (interval type only); TAU uses a tau coefficient as the objective function (nominal type only).

The following notation is used to provide a discussion of fit statistics for illustrative objective functions:

$n_o$ is a number of observations in a dataset,
r is a number of levels for a nominal target variable,
N is a sum of observation frequencies in the data,
$\omega_i$ is a frequency of observation i, so $N=\Sigma_{i=1}^{n_o}\omega_i$,
$y_i$ is a target value of observation i,
$\hat{y}_i$ is a predicted target value of observation i,
m is a number of target levels,
$t_i$ is a level from the target variable in observation i,
$\hat{t}_i$ is a predicted level from the target variable in observation i,
$y_{i,j}=1$ if observation i is assigned to target level j, otherwise $y_{i,j}=0$,
$p_{i,j}$ is a predicted probability that observation i is assigned to target level j,
$m_{tc}$ is a number of total cutoff points,
$a_k$ is a true positive at cutoff point k,
$b_k$ is a false positive at cutoff point k,
$c_k$ is a false negative at cutoff point k,
$\theta=\Sigma_{k=1}^{m_{tc}}(a_{k-1}-a_k)(b_{k-1}-b_k)$,
$\mu=\Sigma_{k=2}^{m_{tc}}((a_{k-1}-a_k)\Sigma_{j=1}^{k}(b_{j-1}-b_j))$,
$w=\Sigma_{k=1}^{m_{tc}}((a_{k-1}-a_k)\Sigma_{j=k+1}^{m_{tc}}(b_{j-1}-b_j))$,
$\rho=a_0 b_0$,
$a_{m_{tc}}=0$
$b_{m_{tc}}=0$
$p=a_k/(a_k+b_k)$,
$q=a_k/(a_k+c_k)$, and
$\beta=0.5$.

For an interval target variable, the objective functions may be defined as:

$$ASE = \frac{1}{N}\sum_{i=1}^{n_o} \omega_i(y_i - \hat{y}_i)^2,$$

$$RASE = \sqrt{ASE},$$

$$MSLE = \frac{1}{N}\sum_{i=1}^{n_o} \omega_i(\log(\hat{y}_i+1) - \log(y_i+1))^2,$$

$$RMSLE = \sqrt{MSLE},$$

$$MAE = \frac{1}{N}\sum_{i=1}^{n_o} \omega_i|y_i - \hat{y}_i|, \text{ and}$$

$$RMAE = \sqrt{MAE}.$$

For a nominal target variable, the objective functions may be defined as:

$$ASE = \frac{1}{rN} \sum_{i=1}^{n_o} \sum_{j=1}^{m} \omega_i (y_{i,j} - p_{i,j})^2,$$

$$RASE = \sqrt{ASE},$$

$$MCE = \frac{1}{N} \sum_{t_i \neq \hat{t}_i} \omega_i, \text{ and}$$

$$MCLL = -\frac{1}{N} \sum_{i=1}^{n_o} \sum_{j=1}^{m} \omega_i y_{i,j} \log p_{i,j}.$$

Additional objective functions may be defined as:

$$AUC = \frac{\mu + \theta/2}{\rho},$$

$$GINI = \frac{\mu - w}{\rho},$$

$$GAMMA = \frac{\mu - w}{\mu + w},$$

$$TAU = \frac{\mu - w}{N/2(N-1)}, \text{ and}$$

$$F05 = \frac{(1 + \beta^2)pq}{\beta^2 p + q}.$$

Various other measures can be used to assess the trained model's performance using validation dataset 126. An accuracy may also be defined as a proportion of a total number of predictions that are correct and can be computed using the equation (TP+TN)/(TP+TN+FP+FN), where TP is true positives, FP is false positives, TN is true negatives, and FN is false negatives. A misclassification rate may also be defined as one minus the accuracy value and can be computed using the equation (FP+FN)/(TP+TN+FP+FN). A sensitivity (also called recall, the true positive rate, or the probability of detection) may also be defined as the proportion of positive cases that are correctly identified and can be computed using the equation TP/(TP+FN). A specificity (also called the true negative rate or negative predictive value) may also be defined as the proportion of negative cases that are correctly identified and can be computed using the equation TN/(TN+FP). An F-score ($F_1$ score or an F-measure) can be computed using the equation $$F_{score} = 2 * \frac{precision * sensitivity}{precision + sensitivity}$$

where the precision can be computed using the equation TP/(TP+FP). F-score is a harmonic mean of the precision and the recall.

In an operation 210, a sixth indicator of an estimation model type to use to select a best estimated feature set and hyperparameter configuration may be received. For example, the sixth indicator indicates a name of the estimation model type. The sixth indicator may be received by parameter selection application 122 after selection from a user interface window or after entry by a user into a user interface window. As an example, the estimation model type may be selected from "Factorization Machine", "LASSO Regression", or any other supervised modeling algorithm. Of course, the estimation model type may be labeled or selected in a variety of different manners by the user as understood by a person of skill in the art. In an alternative embodiment, the estimation model type may not be selectable, and a single estimation model type is implemented in parameter selection application 122 to select the best estimated feature set and hyperparameter configuration. LASSO Regression indicates a least absolute shrinkage and selection operator (LASSO) regression model. For example, a GENSELECT, LOGSELECT, or REGSELECT procedure included in SAS Visual Data Mining and Machine Learning may be used to implement the LASSO regression model type in SAS Viya or the HPREG procedure included in SAS® SAS/STAT® 14.1 developed and provided by SAS Institute Inc. of Cary, N.C., USA may be used to implement the LASSO regression model type in SAS Viya.

A typical factorization machine model includes users and items as nominal input variables and uses corresponding ratings for each user-item combination as an interval target. Factorization machine modeling is very efficient with sparse data because it requires ratings for only a small subset of the user-item combinations. Factorization machine modeling can be used to find a best user-item combination. For the present application, different feature sets are considered users in the factorization machine model and different hyperparameter configurations are considered items in the factorization machine model. For example, suppose that a gradient boosting tree model type is specified for model training in operation 208, a rating for each pair of feature set and hyperparameter configuration can be treated as a prediction error of the corresponding trained gradient boosting tree model. The factorization machine model is trained with a matrix of prediction errors defined by the trained gradient boosting tree model type. The trained factorization machine model estimates the prediction error for missing feature set and hyperparameter configuration pairs. The rationale behind using a factorization machine model is that there are some latent features that most likely determine how a feature set would work for a set of hyperparameter configuration values. For example, feature sets A and B would have a similar test error for a hyperparameter configuration if they both include and exclude some essential information. This property of factorization machine models is useful for learning more about the true features behind the input dataset.

The sixth indicator may further indicate values for one or more optimization parameters to indicate when training is complete for the selected estimation model type such as a maximum number of configuration evaluations, a maximum number of iterations, a maximum time, etc. The sixth indicator may further indicate values for the hyperparameters associated with the selected estimation model type. For example, the factorization machine model type hyperparameters may include the number of factors, the learning step, and the maximum number of iterations. For example, the LASSO regression model type hyperparameters may include a LASSO regularization parameter to control overfitting. A value for each of these hyperparameters may be defined by the sixth indicator or default values may be used.

In an operation 212, a seventh indicator may be received that indicates a percentage of combinations to select for model training and a number of variables $N_{fs}$ of the number of variables $N_f$ of the plurality of variables $v_i$ indicated in operation 204 to include in each feature set. Each combination is a feature set paired with a hyperparameter configuration. In an alternative embodiment, the seventh indicator may not be received. For example, default values for both the percentage of combinations and for the number of variables $N_{fs}$ may be stored, for example, in computer-readable medium 108 and used automatically. For example, a default value for the percentage of combinations may be stored as 5% and/or a default value for the number of variables $N_{fs}$ may be stored as 5 or may be computed as a percentage of the $N_f$ features indicated in operation 204. The percentage of combinations may be defined as a percentage value or as a fractional value. In an alternative embodiment, a percentage of feature sets, and a percentage of hyperparameter configurations may be defined separately.

In an operation 214, the feature set/hyperparameter configuration combinations are defined, for example, as a parameter matrix P(k, l), where k is a number of features sets, and l is a number of hyperparameter configurations. A feature set array may define the features (list of indicators of variables or features) included in each feature set, and a hyperparameter configuration array may define the hyperparameter configuration (values for each hyperparameter) included in each hyperparameter configuration. Each matrix entry in parameter matrix P(k, l) may indicate an index into the feature set array and into the hyperparameter configuration array to identify the feature set and the hyperparameter configuration for that combination.

The array or a list of unique feature sets may be created based on a number of unique combinations of the number of variables $N_{fs}$ that can be chosen from the plurality of variables. Instead of defining the number of variables $N_{fs}$, in an alternative embodiment, the list of unique feature sets may be provided in operation 212. In another alternative embodiment, the number of features sets may be provided by a user and the list of unique feature sets may be randomly selected from the plurality of variables until the number of features sets is defined.

The array or a list of hyperparameter configurations may be created for each unique combination of hyperparameter values, for example, using the lower bound value, the upper bound value, and the iteration value and/or the list of values defined for each hyperparameter based on the model type selected in operation 208. A total number of combinations for evaluation is the number of feature sets included in the array of feature sets multiplied by a number of hyperparameter configurations included in the array of hyperparameter configurations. For example, if the number of feature sets is 1,000 and the number of hyperparameter configurations is 1,000, the total number of combinations included in parameter matrix P(k, l) defined for evaluation is 1,000,000. In an alternative embodiment, the number of hyperparameter configurations may be provided by the user and the list of unique hyperparameter configurations may be randomly selected from the lower bound value, the upper bound value, and the iteration value and/or the list of values until the number of hyperparameter configurations is defined.

In an operation 216, a feature set is randomly selected from the array or the list of unique feature sets for each training model iteration. A number of training model iterations may be computed as the total number of combinations multiplied by the percentage of combinations to select for model training. Alternatively, when the percentage of feature sets and the percentage of hyperparameter configurations are different, a number of training model iterations may be computed as the number of feature sets multiplied by the percentage of feature sets multiplied by the number of hyperparameter configurations multiplied by the percentage of hyperparameter configurations. For example, if the percentage of combinations is 5% and the total number of combinations defined for evaluation is 1,000,000, the number of training model iterations is 50,000 (1,000,000*0.05) where a unique feature set and a unique hyperparameter configuration is selected for each of the 50,000 training model iterations. As another example, if the percentage of feature sets is 100% and there are 1,000 feature set combinations, and the percentage of hyperparameter configurations is 5% and there are 1,000 hyperparameter configurations, the number of training model iterations is also 50,000 (1,000*1*1000*0.05). For example, a feature set index may be randomly selected for each iteration using a uniform distribution function between one and the number of feature sets.

In an operation 218, a hyperparameter configuration is randomly selected for each training model iteration from the list of hyperparameter configurations. For example, a hyperparameter configuration index may be randomly selected for each iteration using a uniform distribution function between one and the number of hyperparameter configurations. As a result, each iteration of the number of training model iterations has a selected feature set and a selected hyperparameter configuration. A test may confirm that each feature set and hyperparameter configuration pair is unique.

As another option, each hyperparameter configuration may be selected using a technique such as Latin hypercube sampling (LHS). LHS samples are exactly uniform across each hyperparameter, but random in combinations. See, for example, a paper by M. D. McKay titled "Latin Hypercube Sampling as a Tool in Uncertainty Analysis of Computer Models" and published In Proceedings of the 24th Conference on Winter Simulation (WSC 1992), edited by J. J. Swain, D. Goldsman, R. C. Crain, and J. R. Wilson, 557-564. New York: ACM (1992), for more information. LHS samples are approximately equidistant from one another in order to fill the space efficiently. This sampling allows for coverage across an entire range of each hyperparameter and is more likely to find good values of each hyperparameter, In an operation 220, an iteration counter i may be initialized as a current iteration. For example, i may be initialized to one.

In an operation 222, training dataset 124 and/or validation dataset 126 may be distributed as needed depending on whether a plurality of computing devices of distributed computing system 128 is used to train the models.

In an operation 224, the feature set and hyperparameter configuration pair for the current iteration are selected.

In an operation 226, a model of the model type indicated in operation 208 is trained using each observation vector read from training dataset 124 with the features (variables) defined by the feature set and using the hyperparameter values defined by the hyperparameter configuration.

In an operation 228, the trained model is validated by executing the trained model with each observation vector read from validation dataset 126 with the features (variables) defined by the feature set and using the hyperparameter values defined by the hyperparameter configuration to predict a target variable value for each observation vector.

In an operation 230, an accuracy value or a prediction error that may be specified in operation 208, for example, using an accuracy measure or the objective function is computed by comparing the target variable value associated with the observation vector in validation dataset 126 to the target variable value predicted by the trained model.

In an operation 232, the parameters that describe each trained model, the feature set, the hyperparameter configuration, and the computed accuracy value or the computed prediction error may be stored in computer-readable medium 108. In an illustrative embodiment, the feature set index and the hyperparameter configuration index may be stored instead of the feature set and the hyperparameter configuration. In another illustrative embodiment, the iteration counter may be stored instead of the feature set index and the hyperparameter configuration index or instead of the feature set and the hyperparameter configuration. The iteration counter, the feature set index, and/or the hyperparameter configuration index may be used to identify the feature set and the hyperparameter configuration.

In an operation 234, a determination is made concerning whether or not there is another iteration of the number of training model iterations. When there is another iteration, processing continues in an operation 236. When there is not another iteration, processing continues in an operation 238 shown referring to FIG. 2B.

In operation 236, iteration counter i is incremented based on i=i+1 and processing continues in operation 224 to repeat the computations for the next iteration as the current iteration.

Referring to FIG. 2B, in operation 238, an estimation model of the estimation model type indicated in operation 210 is trained using the feature set index, hyperparameter configuration index, and accuracy value or prediction error as inputs as well as any hyperparameter(s) defined for the estimation model type indicated in operation 210. In an alternative embodiment, when the iteration counter is stored, the iteration counter may be used to determine the feature set index and the hyperparameter configuration index.

In an operation 240, an accuracy value or a prediction error value is predicted for each feature set and hyperparameter configuration pair of the total number of combinations using the trained estimation model.

In an operation 242, an eighth indicator may be received that indicates a number of feature set and hyperparameter set combinations to train $N_T$. In an alternative embodiment, the eighth indicator may not be received. For example, a default value for the number of feature set and hyperparameter set combinations to train $N_T$ may be stored, for example, in computer-readable medium 108 and used automatically. For example, a default value for the number of feature set and hyperparameter set combinations to train may be $N_T$=20. As another example, a default value for the number of feature set and hyperparameter set combinations to train may be $N_T$=1.

In an operation 244, the $N_T$ feature set and hyperparameter configuration pair(s) are selected using the accuracy value or the prediction error value predicted in operation 240 for each combination of the total number of combinations. For example, the $N_T$ feature set and hyperparameter configuration pair(s) associated with maximum accuracy values or minimum prediction error values may be identified from the values computed for each combination of the total number of combinations. The associated feature set and hyperparameter configuration pair(s) are selected that may be the feature set index and the hyperparameter configuration index associated with a respective pair.

Similar to operation 226, in an operation 246, a model of the model type indicated in operation 208 is trained using each observation vector read from training dataset 124 with each of the $N_T$ feature set and hyperparameter configuration pair(s) selected in operation 244.

Similar to operation 228, in an operation 248, each model trained in operation 246 is validated by executing the trained model with each observation vector read from validation dataset 126 with each respective feature set and hyperparameter configuration pair selected in operation 244 to predict a target variable value for each observation vector.

Similar to operation 230, in an operation 250, an accuracy value or a prediction error that may be specified in operation 208, for example, using an accuracy measure or the objective function is computed by comparing the target variable value associated with the observation vector in validation dataset 126 to the target variable value predicted by each model trained in operation 246.

In an operation 252, a final feature set and hyperparameter set combination that yields the smallest actual test error computed in operation 250 is selected. When $N_T$=1, one or more of operations 248, 250, and 252 may not be performed.

In an operation 254, the parameters that describe the selected trained model, the feature set associated with the respective feature set index of the selected trained model, the hyperparameter configuration associated with the hyperparameter configuration index of the selected trained model, and/or the computed accuracy value or the computed prediction error may be stored in computer-readable medium 108. For example, the parameters may be stored in model and feature set description 128 on computer-readable medium 108. In addition, or in the alternative, one or more output tables may be presented on display 116 or printed on printer 120 or sent to another computing device of distributed computing system 128.

Various operations and combinations of operations of parameter selection application 122 may be performed in parallel using multiple threads and/or using multiple computing devices of distributed computing system 128. For example, operations 224 to 232 may be performed in parallel using a plurality of computing devices of distributed computing system 128 with each computing device assigned the feature set and hyperparameter configuration for different iterations.

Figure 3:
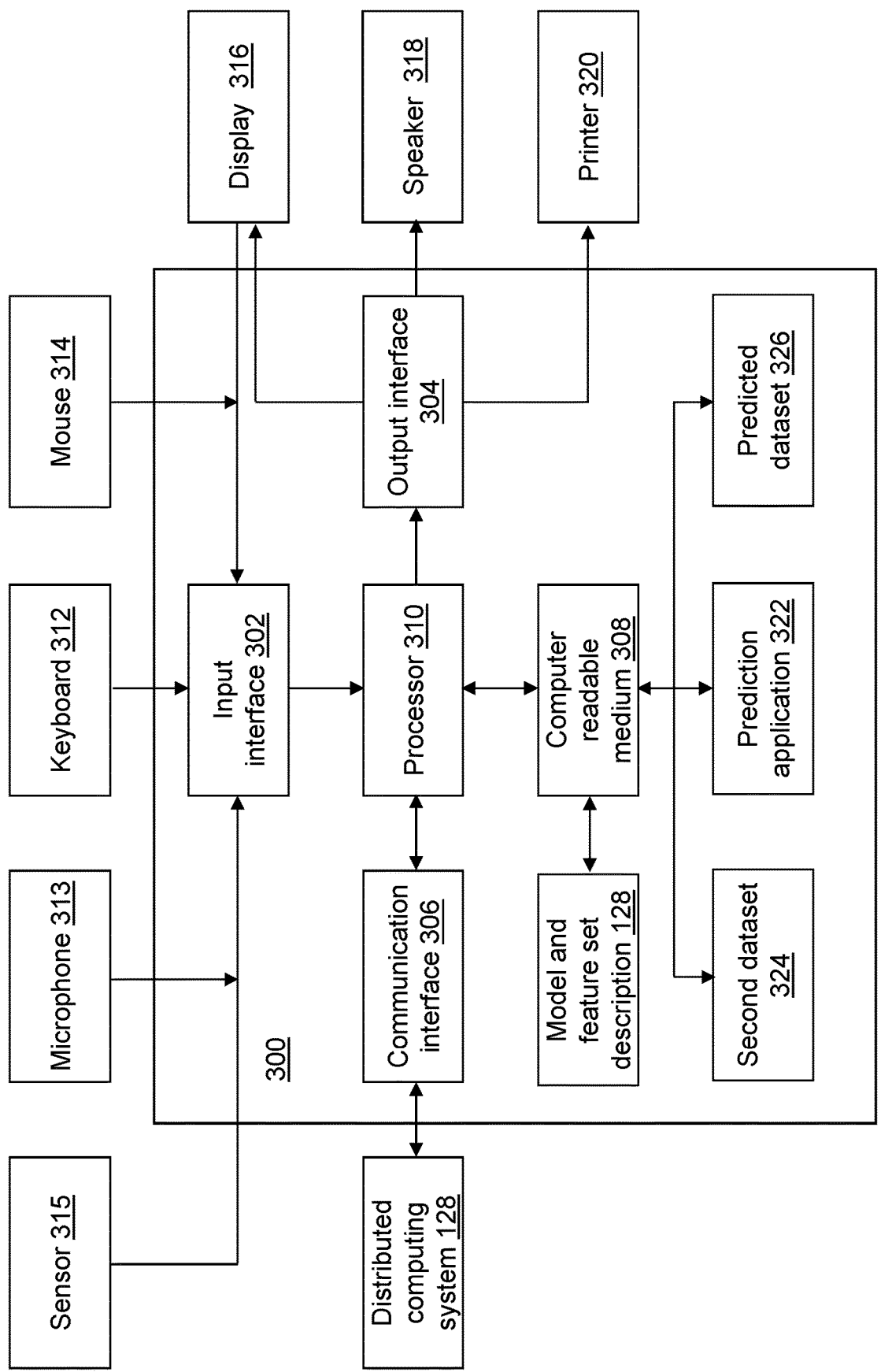
FIG. 3 depicts a block diagram of a prediction device in accordance with an illustrative embodiment.

Referring to FIG. 3, a block diagram of a prediction device 300 is shown in accordance with an illustrative embodiment. Prediction device 300 may include a second input interface 302, a second output interface 304, a second communication interface 306, a second non-transitory computer-readable medium 308, a second processor 310, a prediction application 322, model and feature set description 128, a second dataset 324, and a predicted dataset 326. Fewer, different, and/or additional components may be incorporated into prediction device 300. Prediction device 300 and model training device 100 may be the same or different devices.

Second input interface 302 provides the same or similar functionality as that described with reference to input interface 102 of model training device 100 though referring to prediction device 300. Second output interface 304 provides the same or similar functionality as that described with reference to output interface 104 of model training device 100 though referring to prediction device 300. Second communication interface 306 provides the same or similar functionality as that described with reference to communication interface 106 of model training device 100 though referring to prediction device 300. Data and messages may be transferred between prediction device 300 and distributed computing system 128 using second communication interface 306. Second computer-readable medium 308 provides the same or similar functionality as that described with reference to computer-readable medium 108 of model training device 100 though referring to prediction device 300. Second processor 310 provides the same or similar functionality as that described with reference to processor 110 of model training device 100 though referring to prediction device 300.

Prediction application 322 performs operations associated with classifying or predicting a characteristic from data stored in second dataset 324 that may be stored in predicted dataset 326 to support various data analysis functions as well as provide alert/messaging related to the classified/predicted data. Dependent on the type of data stored in training dataset 124/validation dataset 126 and in second dataset 324, prediction application 322 may identify anomalies as part of process control, for example, of a manufacturing process, for machine condition monitoring, for example, an electrocardiogram device, for image classification, for intrusion detection, for fraud detection, etc. Some or all of the operations described herein may be embodied in prediction application 322. The operations may be implemented using hardware, firmware, software, or any combination of these methods.

Referring to the example embodiment of FIG. 3, prediction application 322 is implemented in software (comprised of computer-readable and/or computer-executable instructions) stored in second computer-readable medium 308 and accessible by second processor 310 for execution of the instructions that embody the operations of prediction application 322. Prediction application 322 may be written using one or more programming languages, assembly languages, scripting languages, etc. Prediction application 322 may be integrated with other analytic tools. As an example, prediction application 322 may be part of an integrated data analytics software application and/or software architecture such as that offered by SAS Institute Inc. of Cary, N.C., USA. For example, prediction application 322 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, prediction application 322 may be implemented using or integrated with one or more SAS software tools such as Base SAS, SAS/STAT®, SAS® Enterprise Miner, SAS® Factory Miner, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 322 further may be performed by an ESPE. Prediction application 322 and parameter selection application 122 may be the same or different applications that are integrated in various manners.

Prediction application 322 may be implemented as a Web application. Prediction application 322 may be integrated with other system processing tools to automatically process data generated as part of operation of an enterprise, to classify data in the processed data, and/or to provide a warning or alert associated with the data classification using second input interface 302, second output interface 304, and/or second communication interface 306 so that appropriate action can be initiated in response. For example, a warning or an alert may be presented using a second display 316, a second speaker 318, a second printer 320, etc. or sent to one or more computer-readable media, display, speaker, printer, etc. of distributed computing system 128.

Training dataset 124 and second dataset 324 may be generated, stored, and accessed using the same or different mechanisms. Similar to training dataset 124, second dataset 324 may include a plurality of rows and a plurality of columns with the plurality of rows referred to as observations or records, and the columns referred to as variables that are associated with an observation. Second dataset 324 may be transposed. Unlike training dataset 124, second dataset 324 does not include a target variable value. Instead, prediction application 322 predicts a value for the target variable value using the trained model.

Similar to training dataset 124, second dataset 324 may be stored on second computer-readable medium 308 or on one or more computer-readable media of distributed computing system 128 and accessed by prediction device 300 using second communication interface 306. Data stored in second dataset 324 may be a sensor measurement or a data communication value, for example, from a sensor 315, may be generated or captured in response to occurrence of an event or a transaction, generated by a device such as in response to an interaction by a user with the device, for example, from a second keyboard 312, a second microphone 313, or a second mouse 314, etc.

The data stored in second dataset 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 324 may be captured at different time points periodically, intermittently, when an event occurs, etc. One or more columns may include a time value. Similar to training dataset 124, data stored in second dataset 324 may be generated as part of the IoT, and some or all data may be pre- or post-processed by an ESPE.

Similar to training dataset 124, second dataset 324 may be stored using various structures as known to those skilled in the art including a file system, a relational database, a system of tables, a structured query language database, etc. on prediction device 300 and/or on distributed computing system 128. Prediction device 300 and/or distributed computing system 128 may coordinate access to second dataset 324 that is distributed across a plurality of computing devices that make up distributed computing system 128. For example, second dataset 324 may be stored in a cube distributed across a grid of computers as understood by a person of skill in the art. As another example, second dataset 324 may be stored in a multi-node Hadoop cluster. As another example, second dataset 324 may be stored in a cloud of computers and accessed using cloud computing technologies, as understood by a person of skill in the art. The SAS LASR Analytic Server and/or SAS Viya may be used as an analytic platform to enable multiple users to concurrently access data stored in second dataset 324.

Referring to FIG. 4, example operations of prediction application 322 are described. Additional, fewer, or different operations may be performed depending on the embodiment of prediction application 322. The order of presentation of the operations of FIG. 4 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 400, a ninth indicator may be received that indicates second dataset 324. For example, the ninth indicator indicates a location and a name of second dataset 324. As an example, the ninth indicator may be received by prediction application 322 after selection from a user interface window or after entry by a user into a user interface window. In an alternative embodiment, second dataset 324 may not be selectable. For example, a most recently created dataset may be used automatically. In an alternative embodiment, prediction application may be implemented using an ESPE in which case data is streamed to prediction device 300 instead of being read from second dataset 324.

In an operation 402, a tenth indicator may be received that indicates model and feature set description 128. For example, the tenth indicator indicates a location and a name of model and feature set description 128. As an example, the tenth indicator may be received by prediction application 322 after selection from a user interface window or after entry by a user into a user interface window. In an alternative embodiment, model and feature set description 128 may not be selectable. For example, a most recently created model description may be used automatically. As another example, model and feature set description 128 may be provided automatically as part of integration with parameter selection application 122.

In an operation 404, a model description is read from model and feature set description 128 including an indication of which variables of second dataset 324 to input to the model as well as the hyperparameter values to use and the parameters that describe the trained model based on the model type.

In an operation 406, a model is instantiated using the read model description. When model and feature set description 128 does not include the parameters that describe the trained model, the model may be trained which instantiates the model.

In an operation 408, an observation vector is read from second dataset 324.

In an operation 410, the observation vector is pre-processed, if any pre-processing is performed, for example, if one or more additional variables is computed from one or more variables stored in second dataset 324. For illustration, if a variable of the selected feature set read from model and feature set description 128 is a computed value, a new value is similarly computed from the existing observation vector values.

In an operation 412, the features (variables) defined by the feature set selected from the optionally pre-processed observation vector are input to the instantiated model.

In an operation 414, an output of the instantiated model is received. The output may indicate a predicted characteristic computed from the observation vector using the instantiated model.

In an operation 416, the predicted characteristic may be output, for example, by storing the predicted characteristic with the observation vector to predicted dataset 326. In addition, or in the alternative, the predicted characteristic may be presented on second display 316, printed on second printer 320, sent to another computing device using second communication interface 306, an alarm or other alert signal may be sounded through second speaker 318, etc.

In an operation 418, a determination is made concerning whether or not second dataset 324 includes another observation vector. When second dataset 324 includes another observation vector, processing continues in an operation 420. When second dataset 324 does not include another observation vector, processing continues in an operation 422.

In operation 420, a next observation vector is read from second dataset 324 or received through streaming to prediction device 300, and processing continues in operation 410.

In operation 422, processing stops and cleanup is performed as needed.

Parameter selection application 122 provides a practical and efficient approach to finding a best feature set and hyperparameter configuration pair with minimal computational cost by only training models for a small subset of a feature space and a hyperparameter space. For example, training a LASSO regression model to estimate an accuracy value or a prediction error based on a small percentage of trained model results is computationally very efficient because it requires only one pass through training dataset 124, thus further decreasing the computational cost that already avoids training a model for the entire feature set and hyperparameter configuration spaces. Another advantage of the LASSO regression model is that it includes a single hyperparameter making it simple and fast.

For illustration, Boston housing data may be analyzed using a gradient boosting model type. The Boston housing data set includes 505 observations of housing values in suburbs of Boston. 25% of the Boston housing data was reserved as validation dataset 126 with the remainder forming training dataset 124. The target variable was a median value of owner-occupied homes. Training dataset 124 included 13 interval features that are listed below.

| | | |
|---|---|---|
| 1. | CRIM | per capita crime rate by town |
| 2. | ZN | proportion of residential land zoned for lots over 25,000 sq. ft. |
| 3. | INDUS | proportion of non-retail business acres per town |
| 4. | CHAS | Charles River variable (=1 if tract bounds river; 0 otherwise) |
| 5. | NOX | nitric oxides concentration (parts per 10 million) |
| 6. | RM | average number of rooms per dwelling |
| 7. | AGE | proportion of owner-occupied units built prior to 1940 |
| 8. | DIS | weighted distances to five Boston employment centers |
| 9. | RAD | index of accessibility to radial highways |
| 10. | TAX | full-value property-tax rate per $10,000 |
| 11. | PTRATIO | pupil-teacher ratio by town |
| 12. | B | $1000(Bk - 0.63)^2$ where Bk is the proportion of blacks by town |
| 13. | LSTAT | % lower status of the population |

100 randomly selected feature sets including five input variables were selected from the 13 interval features. 100 randomly selected hyperparameter configurations were selected for the six hyperparameters: the L1 norm regularization parameter, the learning rate, the number of trees to grow, the L2 norm regularization parameter, the fraction of the training data to be used for growing each tree, and the number of variables to examine at each node split.

The minimum prediction error was selected to identify the "best" pair of the feature set and the hyperparameter configuration. Instead of fitting a gradient boosting model for each combination (100×100=10,000), 10 out of the 100 hyperparameter configurations (10% used as percentage of hyperparameter configurations) were selected for each feature set (100% used as percentage of feature sets) resulting in 100×10=1,000 trained gradient boosting models. Each gradient boosting models can be trained and validated in parallel, further decreasing the computational cost as discussed previously. Illustrative results are shown in Table 1 below.

TABLE 1

| Model | Feature Set | Hyperparameter configuration | Prediction error |
|---|---|---|---|
| 1 | 1 | 49 | 61.23 |
| 2 | 1 | 68 | 58.64 |
| 3 | 1 | 23 | 75.39 |
| 4 | 1 | 59 | 67.14 |
| ... | ... | ... | ... |
| 1000 | 100 | 61 | 85.19 |

After sorting Table 1 for a minimum prediction error, Table 2 below was created.

TABLE 2

| Feature Set | Hyperparameter configuration | Prediction error |
|---|---|---|
| 13 | 94 | 40.5745 |
| 16 | 71 | 43.736 |
| 13 | 2 | 44.239 |
| 16 | 12 | 44.392 |
| 79 | 34 | 46.984 |
| 79 | 94 | 47.178 |
| ... | ... | ... |

Feature set 13 included nox, rm, rad, b, and lstat. Hyperparameter configuration 94 included L1 norm regularization parameter equal to 0.06, the learning rate equal to 0.54, the number of trees to grow equal to 150, the fraction of the training data to be used for growing each tree equal to 0.61, the fraction of variables to examine at each node split equal to 0.75, and the max depth of trees is 8.

A LASSO regression model was trained with the prediction errors for the selected combinations (1,000) of feature set and hyperparameter configuration pairs. The LASSO regression model treated the feature set and hyperparameter configuration columns in Table 2 as two nominal inputs (V1 and V2, each with 100 levels), and the target was the prediction error (V3). 25% of the data (250 observations) was reserved as validation dataset 126 to evaluate a performance of the trained model in predicting the prediction error.

Using the trained LASSO regression model, prediction errors were computed for all 10,000 combinations, and the combination that yielded a minimum LASSO prediction error was identified. The trained LASSO regression model predicted that the combination of feature set 13 and hyperparameter configuration 61 would yield a minimum prediction error. To verify this would actually yield a good model, a gradient boosting tree model was trained using these values. The trained model resulted in a model with an actual prediction error of 35.63 as compared to the LASSO predicted prediction error of 51.15, which is much smaller than the minimum prediction error of the 1,000 pretrained gradient boosting models that was 40.57.

Though the LASSO error is larger than the actual test errors, the feature set and hyperparameter combination for the smallest LASSO error yielded a very good model for gradient boosting. The goal for fitting a LASSO model was to find a good combination of a feature set and hyperparameter set with minimal actual test error. Note that feature set 13 and hyperparameter 61 set does not yield the smallest actual test error model, but was still a very good model that users can directly use for training a gradient boosting model. The smallest actual test error model was found for the feature set 13 and hyperparameter set 72. When a gradient boosting model was trained using $N_T=20$, the final feature set and hyperparameter set combination that yielded the smallest actual test error (feature set 13 and hyperparameter set 72) was selected. The median actual error for all 10,000 models was approximately 65 with a standard error of approximately 10. Using parameter selection application 122 with $N_T=20$, the actual test error was approximately 37 for the twenty trained models, which is much lower indicating that parameter selection application 122 successfully identified the best pairs.

There is no existing method that combines the search for the optimal feature set with the optimal hyperparameter set. Timing results are directly linked to how many of the possible pairs are sampled to train models in operation 212 and in operation 242. If 5% are sampled, parameter selection application 122 is 20 times faster than a computation of the entire grid of possible pairs. There is the additional cost of training models for the number of feature set and hyperparameter set combinations to train $N_T$ to find the actual test error though this is small in comparison to training the entire grid of possible pairs.

In summary, this simulation study proves that parameter selection application 122 is efficient in finding a hyperparameter configuration and a feature set combination that can significantly boost the prediction accuracy. Moreover, parameter selection application 122 is highly flexible and can be used for a wide range of machine learning applications. LASSO modeling is a good fit for solving this problem, because it can control overfitting through its regularization parameter, it is easy to tune, and it is computationally very efficient and interpretable. Perhaps more importantly, the proposed technique significantly improves model automation by combining feature selection with hyperparameter tuning at a minimal computational cost.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   define a plurality of feature sets to evaluate for input to a machine learning model, wherein each feature set of the plurality of feature sets uniquely indicates a plurality of variables, wherein each of the plurality of variables are a subset of a second plurality of variables included in an input dataset;
   define a plurality of hyperparameter configurations to evaluate for input to the machine learning model, wherein each hyperparameter configuration of the plurality of hyperparameter configurations indicates a value for each hyperparameter of a plurality of hyperparameters associated with a model type of the machine learning model, wherein each hyperparameter configuration of the plurality of hyperparameter configurations is unique;
   determine a number of training model iterations based on a number of the defined plurality of feature sets and a number of the defined plurality of hyperparameter configurations, wherein the determined number of training model iterations is less than the number of the defined plurality of feature sets times the number of the defined plurality of hyperparameter configurations;

select a unique evaluation pair for each of the determined number of training model iterations, wherein each evaluation pair indicates a feature set selected from the defined plurality of feature sets and a hyperparameter configuration selected from the defined plurality of hyperparameter configurations;

(a) select a current feature set based on the feature set of the unique evaluation pair selected for a current iteration number;

(b) select a current hyperparameter configuration based on the hyperparameter configuration of the unique evaluation pair selected for the current iteration number;

(c) train a machine learning model of the model type using features selected from a training dataset based on the selected current feature set and the selected current hyperparameter configuration;

(d) validate the trained machine learning model using features selected from a validation dataset based on the selected current feature set and the selected current hyperparameter configuration to compute a performance measure value;

(e) store the computed performance measure value and an indicator of the selected current feature set and the selected current hyperparameter configuration;

(f) increment the current iteration number;

repeat (a) to (f) until each of the determined number of training model iterations has been performed;

train an estimation model using the feature set, the hyperparameter configuration, and the performance measure value stored for each iteration as inputs;

execute the trained estimation model to compute the performance measure value for each feature set of the defined plurality of feature sets in combination with each hyperparameter configuration of the defined plurality of hyperparameter configurations;

select a final feature set and a final hyperparameter configuration based on the computed performance measure value; and output the selected final feature set and final hyperparameter configuration to predict a value for a characteristic of a new observation vector.

2. The non-transitory computer-readable medium of claim 1, wherein the number of training model iterations is determined as a predefined percentage of the number of the defined plurality of feature sets and the number of the defined plurality of hyperparameter configurations.

3. The non-transitory computer-readable medium of claim 2, wherein the predefined percentage is less than 50%.

4. The non-transitory computer-readable medium of claim 3, wherein the predefined percentage is less than 10%.

5. The non-transitory computer-readable medium of claim 1, wherein the number of training model iterations is determined as a first predefined percentage of the number of the defined plurality of feature sets and a second predefined percentage the number of the defined plurality of hyperparameter configurations, wherein the first predefined percentage is different than the second predefined percentage.

6. The non-transitory computer-readable medium of claim 1, wherein the computer-readable instructions further cause the computing device to:

train a final machine learning model of the model type using features selected from the training dataset based on the final feature set and the final hyperparameter configuration; and output a description of the trained final machine learning model.

7. The non-transitory computer-readable medium of claim 6, wherein the computer-readable instructions further cause the computing device to:

instantiate a predictive model from the description of the trained final machine learning model;

compute the characteristic of the new observation vector using the instantiated predictive model; and output the computed characteristic of the new observation vector.

8. The non-transitory computer-readable medium of claim 1, wherein a model type of the estimation model is a least absolute shrinkage and selection operator regression model type or a factorization machine model type.

9. The non-transitory computer-readable medium of claim 1, wherein the model type of the machine learning model is selected from the group consisting of a decision tree model type, a factorization machine model type, a forest model type, a gradient boosting tree model type, a neural network model type, and a support vector machine model type.

10. The non-transitory computer-readable medium of claim 1, wherein each hyperparameter configuration may be selected using Latin hypercube sampling method.

11. The non-transitory computer-readable medium of claim 1, wherein (c), (d), and (e) are performed in parallel on different computing devices for different iterations of the determined number of training model iterations.

12. The non-transitory computer-readable medium of claim 1, wherein the performance measure value is an accuracy value.

13. The non-transitory computer-readable medium of claim 1, wherein the performance measure value is an error value.

14. The non-transitory computer-readable medium of claim 1, wherein after executing the trained estimation model and before selecting the final feature set and the final hyperparameter configuration, the computer-readable instructions further cause the computing device to:

select a plurality of feature set and hyperparameter configuration pairs based on the computed performance measure value of each respective pair;

train a second machine learning model of the model type using the training dataset with each pair of the selected plurality of feature set and hyperparameter configuration pairs; and validate each trained second machine learning model using the validation dataset to compute the performance measure value for each respective pair, wherein the final feature set and the final hyperparameter configuration are selected based on the computed performance measure value for each respective pair.

15. A computing device comprising:

a processor; and a non-transitory computer-readable medium operably coupled to the processor, the computer-readable medium having computer-readable instructions stored thereon that, when executed by the processor, cause the computing device to define a plurality of feature sets to evaluate for input to a machine learning model, wherein each feature set of the plurality of feature sets uniquely indicates a plurality of variables, wherein each of the plurality of variables are a subset of a second plurality of variables included in an input dataset;

define a plurality of hyperparameter configurations to evaluate for input to the machine learning model, wherein each hyperparameter configuration of the plurality of hyperparameter configurations indicates a value for each hyperparameter of a plurality of hyperparameters associated with a model type of the machine learning model, wherein each hyperparameter configuration of the plurality of hyperparameter configurations is unique;

determine a number of training model iterations based on a number of the defined plurality of feature sets and a number of the defined plurality of hyperparameter configurations, wherein the determined number of training model iterations is less than the number of the defined plurality of feature sets times the number of the defined plurality of hyperparameter configurations;

select a unique evaluation pair for each of the determined number of training model iterations, wherein each evaluation pair indicates a feature set selected from the defined plurality of feature sets and a hyperparameter configuration selected from the defined plurality of hyperparameter configurations;

(a) select a current feature set based on the feature set of the unique evaluation pair selected for a current iteration number;

(b) select a current hyperparameter configuration based on the hyperparameter configuration of the unique evaluation pair selected for the current iteration number;

(c) train a machine learning model of the model type using features selected from a training dataset based on the selected current feature set and the selected current hyperparameter configuration;

(d) validate the trained machine learning model using features selected from a validation dataset based on the selected current feature set and the selected current hyperparameter configuration to compute a performance measure value;

(e) store the computed performance measure value and an indicator of the selected current feature set and the selected current hyperparameter configuration;

(f) increment the current iteration number;

repeat (a) to (f) until each of the determined number of training model iterations has been performed;

train an estimation model using the feature set, the hyperparameter configuration, and the performance measure value stored for each iteration as inputs;

execute the trained estimation model to compute the performance measure value for each feature set of the defined plurality of feature sets in combination with each hyperparameter configuration of the defined plurality of hyperparameter configurations;

select a final feature set and a final hyperparameter configuration based on the computed performance measure value; and output the selected final feature set and final hyperparameter configuration to predict a value for a characteristic of a new observation vector.

16. The computing device of claim 15, wherein a model type of the estimation model is a least absolute shrinkage and selection operator regression model type or a factorization machine model type.

17. A method of selecting a feature set and hyperparameters for a machine learning model to predict a value for a characteristic in a scoring dataset, the method comprising:

defining, by a computing device, a plurality of feature sets to evaluate for input to a machine learning model, wherein each feature set of the plurality of feature sets uniquely indicates a plurality of variables, wherein each of the plurality of variables are a subset of a second plurality of variables included in an input dataset;

defining, by the computing device, a plurality of hyperparameter configurations to evaluate for input to the machine learning model, wherein each hyperparameter configuration of the plurality of hyperparameter configurations indicates a value for each hyperparameter of a plurality of hyperparameters associated with a model type of the machine learning model, wherein each hyperparameter configuration of the plurality of hyperparameter configurations is unique;

determining, by the computing device, a number of training model iterations based on a number of the defined plurality of feature sets and a number of the defined plurality of hyperparameter configurations, wherein the determined number of training model iterations is less than the number of the defined plurality of feature sets times the number of the defined plurality of hyperparameter configurations;

selecting, by the computing device, a unique evaluation pair for each of the determined number of training model iterations, wherein each evaluation pair indicates a feature set selected from the defined plurality of feature sets and a hyperparameter configuration selected from the defined plurality of hyperparameter configurations;

(a) selecting, by the computing device, a current feature set based on the feature set of the unique evaluation pair selected for a current iteration number;

(b) selecting, by the computing device, a current hyperparameter configuration based on the hyperparameter configuration of the unique evaluation pair selected for the current iteration number;

(c) training, by the computing device, a machine learning model of the model type using features selected from a training dataset based on the selected current feature set and the selected current hyperparameter configuration;

(d) validating, by the computing device, the trained machine learning model using features selected from a validation dataset based on the selected current feature set and the selected current hyperparameter configuration to compute a performance measure value;

(e) storing, by the computing device, the computed performance measure value and an indicator of the selected current feature set and the selected current hyperparameter configuration;

(f) incrementing, by the computing device, the current iteration number;

repeating, by the computing device, (a) to (f) until each of the determined number of training model iterations has been performed;

training, by the computing device, an estimation model using the feature set, the hyperparameter configuration, and the performance measure value stored for each iteration as inputs;

executing, by the computing device, the trained estimation model to compute the performance measure value for each feature set of the defined plurality of feature sets in combination with each hyperparameter configuration of the defined plurality of hyperparameter configurations;

selecting, by the computing device, a final feature set and a final hyperparameter configuration based on the computed performance measure value; and outputting, by the computing device, the selected final feature set and final hyperparameter configuration to predict a value for a characteristic of a new observation vector.

18. The method of claim 17, wherein the number of training model iterations is determined as a predefined percentage of the number of the defined plurality of feature sets and the number of the defined plurality of hyperparameter configurations.

19. The method of claim 18, wherein the predefined percentage is less than 50%.

20. The method of claim 19, wherein the predefined percentage is less than 10%.

21. The method of claim 17, wherein the number of training model iterations is determined as a first predefined percentage of the number of the defined plurality of feature sets and a second predefined percentage the number of the defined plurality of hyperparameter configurations, wherein the first predefined percentage is different than the second predefined percentage.

22. The method of claim 17, further comprising:
training, by the computing device, a final machine learning model of the model type using features selected from the training dataset based on the final feature set and the final hyperparameter configuration; and
outputting, by the computing device, a description of the trained final machine learning model.

23. The method of claim 22, further comprising:
instantiating, by the computing device, a predictive model from the description of the trained final machine learning model;
computing, by the computing device, the characteristic of the new observation vector using the instantiated predictive model; and
outputting, by the computing device, the computed characteristic of the new observation vector.

24. The method of claim 17, wherein a model type of the estimation model is a least absolute shrinkage and selection operator regression model type or a factorization machine model type.

25. The method of claim 17, wherein the model type of the machine learning model is selected from the group consisting of a decision tree model type, a factorization machine model type, a forest model type, a gradient boosting tree model type, a neural network model type, and a support vector machine model type.

26. The method of claim 17, wherein each hyperparameter configuration may be selected using Latin hypercube sampling method.

27. The method of claim 17, wherein (c), (d), and (e) are performed in parallel on different computing devices for different iterations of the determined number of training model iterations.

28. The method of claim 17, wherein the performance measure value is an accuracy value.

29. The method of claim 17, wherein the performance measure value is an error value.

30. The method of claim 17, further comprising, after executing the trained estimation model and before selecting the final feature set and the final hyperparameter configuration:
selecting, by the computing device, a plurality of feature set and hyperparameter configuration pairs based on the computed performance measure value of each respective pair;
training, by the computing device, a second machine learning model of the model type using the training dataset with each pair of the selected plurality of feature set and hyperparameter configuration pairs; and
validating, by the computing device, each trained second machine learning model using the validation dataset to compute the performance measure value for each respective pair,
wherein the final feature set and the final hyperparameter configuration are selected based on the computed performance measure value for each respective pair.

* * * * *

UNITED STATES PATENT AND TRADEMARK OFFICE
CERTIFICATE OF CORRECTION

PATENT NO. : 10,600,005 B2  
APPLICATION NO. : 16/411590  
DATED : March 24, 2020  
INVENTOR(S) : Funda Gunes et al.

Page 1 of 1

It is certified that error appears in the above-identified patent and that said Letters Patent is hereby corrected as shown below:

In the Specification

Column 14, Line 23:

Delete the phrase "$N = \Sigma_{i=1}{}^{n_o} \omega_i,$" and replace with -- $N = \sum_{i=1}^{n_o} \omega_i,$ --.

Column 14, Lines 39-41:

Delete the phrase "
$$\theta = \Sigma_{k=1}{}^{m_{tc}}(a_{k-1} - a_k)(b_{k-1} - b_k),$$
$$\mu = \Sigma_{k=2}{}^{m_{tc}}((a_{k-1} - a_k)\Sigma_{j=1}{}^{k}(b_{j-1} - b_j)),$$
$$w = \Sigma_{k-1}{}^{m_{tc}}((a_{k-1} - a_k)\Sigma_{j-k+1}{}^{m_{tc}}(b_{j-1} - b_j)),$$
" and replace with --
$$\theta = \sum_{k=1}^{m_{tc}}(a_{k-1} - a_k)(b_{k-1} - b_k),$$
$$\mu = \sum_{k=2}^{m_{tc}}((a_{k-1} - a_k)\sum_{j=1}^{k}(b_{j-1} - b_j)),$$
$$w = \sum_{k=1}^{m_{tc}}((a_{k-1} - a_k)\sum_{j=k+1}^{m_{tc}}(b_{j-1} - b_j)),$$
--.

Column 25, Line 14:
Delete the phrase "Feature set 13 included nox, rm, rad, b, and Istat." and replace with --Feature set 13 included nox, rm, rad, b, and 1stat.--.

Signed and Sealed this  
Twenty-third Day of June, 2020

Andrei Iancu  
*Director of the United States Patent and Trademark Office*